United States Patent
Yasui et al.

(10) Patent No.: US 10,913,457 B2
(45) Date of Patent: Feb. 9, 2021

(54) VEHICLE CONTROLLER, VEHICLE CONTROL METHOD, AND STORAGE MEDIUM

(71) Applicant: HONDA MOTOR CO., LTD., Tokyo (JP)

(72) Inventors: Yuji Yasui, Wako (JP); Hideki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 15/990,932

(22) Filed: May 29, 2018

(65) Prior Publication Data

US 2018/0345969 A1 Dec. 6, 2018

(30) Foreign Application Priority Data

Jun. 2, 2017 (JP) ................... 2017-110195

(51) Int. Cl.
*B60W 30/17* (2020.01)
*B60W 50/02* (2012.01)
*G08G 1/16* (2006.01)
*B60W 50/04* (2006.01)
*G08G 1/0968* (2006.01)

(52) U.S. Cl.
CPC ............ *B60W 30/17* (2013.01); *B60W 50/02* (2013.01); *B60W 50/04* (2013.01); *G08G 1/096822* (2013.01); *G08G 1/096833* (2013.01); *G08G 1/166* (2013.01); *B60W 2420/42* (2013.01); *G08G 1/167* (2013.01)

(58) Field of Classification Search
CPC ...... B60W 30/17; B60W 50/02; B60W 50/04; B60W 2420/42; B60W 30/09; G08G 1/096833; G08G 1/096822; G08G 1/166; G08G 1/167
USPC .......................................................... 701/70
See application file for complete search history.

(56) References Cited

FOREIGN PATENT DOCUMENTS

| JP | 2007-280213 | 10/2007 |
| JP | 2009-196487 | 9/2009 |
| JP | 2009196487 A * | 9/2009 |
| JP | 2017-081382 | 5/2017 |

OTHER PUBLICATIONS

Japanese Office Action for Japanese Patent Application No. 2017-110195 dated Oct. 2, 2018.

* cited by examiner

*Primary Examiner* — Maceeh Anwari
(74) *Attorney, Agent, or Firm* — Amin, Turocy & Watson, LLP

(57) ABSTRACT

A vehicle controller includes: a recognizer (121,122) configured to recognize a distance to a stop position as a first distance on the basis of an image captured by an imaging unit that images the front of a vehicle; and a braking distance estimator (123B) configured to estimate a braking distance to the stop position on the basis of the first distance recognized by the recognizer at a predetermined time point and a second distance acquired on the basis of a speed of the vehicle and to adjust a degree of reflection of the second distance in the braking distance on the basis of the first distance recognized by the recognizer after the predetermined time point.

7 Claims, 13 Drawing Sheets

VEHICLE CONTROLLER, VEHICLE CONTROL METHOD, AND STORAGE MEDIUM

CROSS-REFERENCE TO RELATED APPLICATION

Priority is claimed on Japanese Patent Application No. 2017-110195, filed Jun. 2, 2017, the content of which is incorporated herein by reference.

BACKGROUND OF THE INVENTION

Field of the Invention

The invention relates to a vehicle controller, a vehicle control method, and a storage medium.

Description of Related Art

Automated driving of allowing a vehicle to travel autonomously without requiring an operation by an occupant has been studied (for example, see Japanese Unexamined Patent Application, First Publication No. 2017-81382).

SUMMARY OF THE INVENTION

In automated driving, it is assumed that a vehicle stops at a stop position such as a stop line. Here, when a braking force is determined on the basis of a distance to a stop position (a braking distance) which is acquired by recognizing an image captured by a camera, the braking distance acquired by recognition of an image may vary because an image is shaken due to pitching based on acceleration/deceleration of a vehicle or unevenness of a road surface. When this braking distance is used for braking control as it were, a braking force which is output varies, smooth stopping behavior is not exhibited, and thus an occupant may feel discomfort. When a process of smoothing a braking force using a low-pass filter or the like is performed in order to avoid this problem, a delay with respect to an actual variation in a distance occurs and the vehicle may not stop at the stop position.

Aspects of the invention are made in consideration of the above-mentioned circumstances and an object thereof is to provide a vehicle controller, a vehicle control method, and a program that can cause a vehicle to more accurately stop at a stop position through smooth deceleration.

A vehicle controller, a vehicle control method, and a storage medium according to the invention employ the following configurations.

(1) According to an aspect of the invention, there is provided a vehicle controller including: a recognizer configured to recognize a distance to a stop position as a first distance on the basis of an image captured by an imaging unit that images the front of a vehicle; and a braking distance estimator configured to estimate a braking distance to the stop position on the basis of the first distance recognized by the recognizer at a predetermined time point and a second distance acquired on the basis of a speed of the vehicle and to adjust a degree of reflection of the second distance in the braking distance on the basis of the first distance recognized by the recognizer after the predetermined time point.

(2) In the aspect of (1), the second distance may be a traveling distance sum value in control cycles after the predetermined time point, and the braking distance estimator may be configured to estimate the braking distance by repeatedly performing subtraction of a value, which is obtained by multiplying the traveling distance sum value by a predetermined coefficient which is the degree of reflection, from the first distance recognized by the recognizer at the predetermined time point, and to adjust the predetermined coefficient on the basis of the first distance recognized by the recognizer in each control cycle.

(3) In the aspect of (1), the second distance may be a traveling distance sum value in control cycles after the predetermined time point, and the braking distance estimator may be configured to estimate the braking distance by repeatedly performing subtraction of a value, which is obtained by adding or subtracting a predetermined correction value which is the degree of reflection to or from the traveling distance sum value, from the first distance recognized by the recognizer at the predetermined time point, and to adjust the predetermined correction value on the basis of the first distance recognized by the recognizer in each control cycle.

(4) In the aspect of (1), the second distance may be a traveling distance sum value in control cycles after the predetermined time point, and the braking distance estimator may be configured to adjust the degree of reflection of the traveling distance sum value in each control cycle in the braking distance on the basis of a difference between a change of the first distance recognized by the recognizer from the predetermined time point to the control cycle and a control cycle and the traveling distance sum value.

(5) In the aspect of (1), the braking distance estimator may be configured to stop updating of the degree of reflection when the first distance recognized by the recognizer is equal to or less than a threshold value.

(6) According to another aspect of the invention, there is provided a vehicle control method using a computer mounted in a host vehicle, comprising: recognizing a distance to a stop position as a first distance on the basis of an image captured by an imaging unit that images the front of a vehicle; estimating a braking distance to the stop position on the basis of the recognized first distance at a predetermined time point and a second distance acquired on the basis of a speed of the vehicle; and adjusting a degree of reflection of the second distance in the braking distance on the basis of the first distance recognized after the predetermined time point.

(7) According to still another aspect of the invention, there is provided a non-transitory computer-readable storage medium storing a program causing a computer to perform: recognizing a distance to a stop position as a first distance on the basis of an image captured by an imaging unit that images the front of a vehicle; estimating a braking distance to the stop position on the basis of the recognized first distance at a predetermined time point and a second distance acquired on the basis of a speed of the vehicle; and adjusting a degree of reflection of the second distance in the braking distance on the basis of the first distance recognized after the predetermined time point.

According to the aspects of (1) to (7), it is possible to cause a vehicle to accurately stop at a stop position through smooth deceleration.

According to the aspect of (5), even when a vehicle approaches a stop position and the stop position has been hidden by an engine hood or the like of the vehicle as viewed from an imaging unit, it is possible to continuously smoothly decelerate the vehicle.

DETAILED DESCRIPTION OF THE INVENTION

Hereinafter, a vehicle controller, a vehicle control method, and a storage medium according to an embodiment of the invention will be described with reference to the accompanying drawings.

<Entire Configuration>

Figure 1:
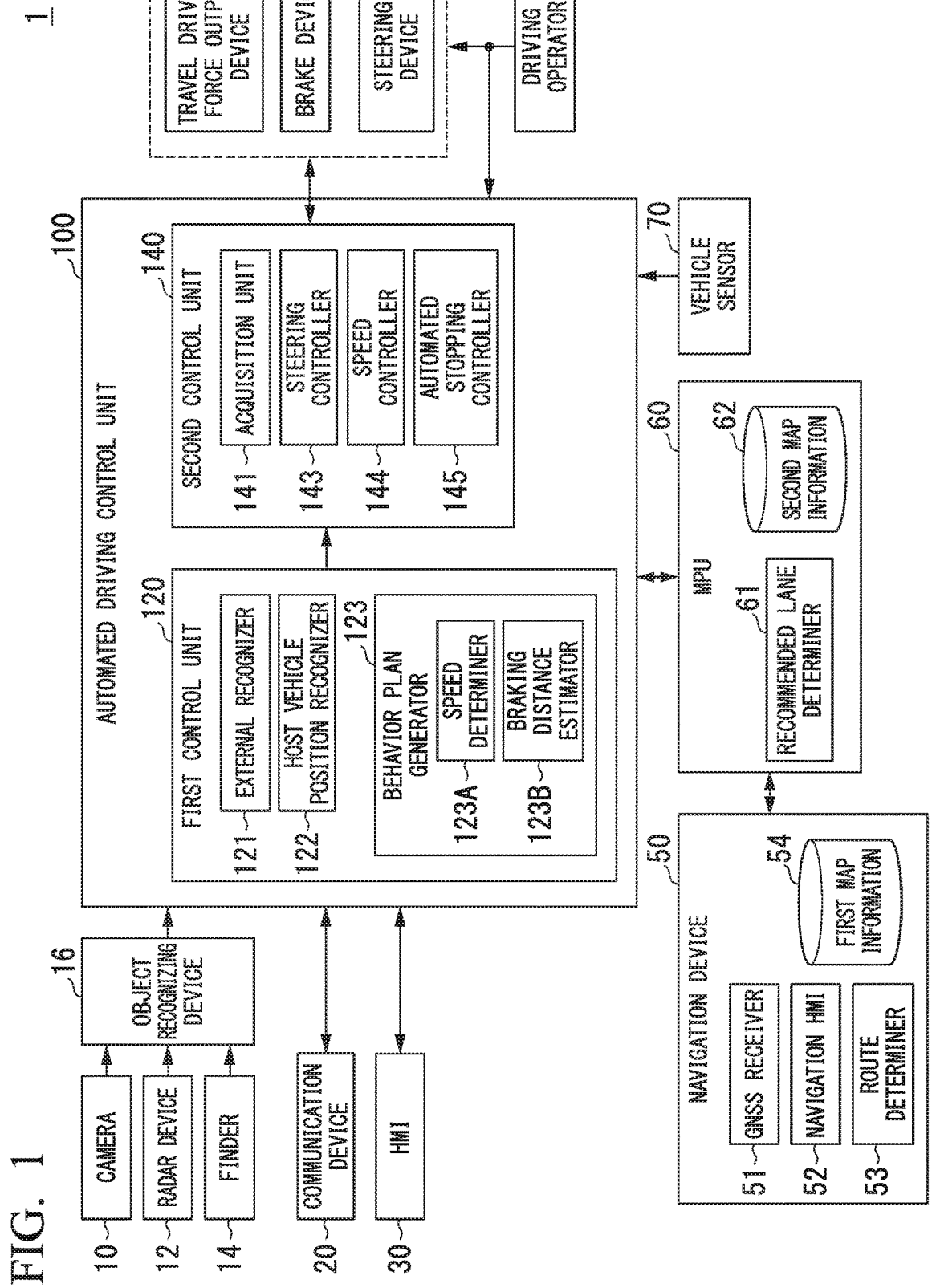
FIG. 1 is a diagram illustrating a configuration of a vehicle system 1 using a vehicle controller according to an embodiment.

FIG. 1 is a diagram illustrating a configuration of a vehicle system 1 using a vehicle controller according to an embodiment. A vehicle in which the vehicle system 1 is mounted, for example, in a vehicle with two wheels, three wheels, or four wheels and a drive source thereof is an internal combustion engine such as a diesel engine or a gasoline engine, an electric motor, or a combination thereof. An electric motor operates using electric power generated by a power generator connected to the internal combustion engine or electric power discharged from a secondary battery or a fuel cell.

The vehicle system 1 includes, for example, a camera 10, a radar device 12, a finder 14, an object recognizing device 16, a communication device 20, a human-machine interface (HMI) 30, a navigation device 50, a map positioning unit (MPU) 60, a vehicle sensor 70, a driving operator 80, an automated driving control unit 100, a travel driving force output device 200, a brake device 210, and a steering device 220. These devices or units are connected to each other via a multiplex communication line such as a controller area network (CAN) communication line, a serial communication line, a radio communication network, or the like. The configuration illustrated in FIG. 1 is only an example and a part of the configuration may be omitted or another configuration may be added thereto.

The camera 10 is a digital camera using a solid-state imaging device such as a charge coupled device (CCD) or a complementary metal oxide semiconductor (CMOS). One or more cameras 10 are attached to arbitrary positions on the vehicle (hereinafter referred to as a host vehicle M) in which the vehicle system 1 is mounted. When the front of the vehicle is imaged, the camera 10 is attached to an upper part of a front windshield, a rear surface of a rear-view mirror, or the like. The camera 10 images the surroundings of the host vehicle M, for example, periodically and repeatedly. The camera 10 may be a stereoscopic camera.

The radar device 12 radiates radio waves such as millimeter waves to the surroundings of the host vehicle M, detects radio waves (reflected waves) reflected by an object, and detects at least a position (a distance and a direction) of the object. One or more radar devices 12 are attached to arbitrary positions on the host vehicle M. The radar device 12 may detect a position and a speed of an object using a frequency modulated continuous wave (FM-CW) method.

The finder 14 is a light detection and ranging or laser imaging detection and ranging (LIDAR) that measures scattered light in response to applied light and detects a distance to an object. One or more finders 14 are attached to arbitrary positions on the host vehicle M.

The object recognizing device 16 performs sensor fusion processing on detection results from all or some of the camera 10, the radar device 12, and the finder 14 and recognizes a position, a type, a speed, and the like of an object. The object recognizing device 16 outputs the recognition results to the automated driving control unit 100. The object recognizing device 16 may output the detection results of the camera 10, the radar device 12, and the finder 14 to the automated driving control unit 100 without any change if necessary.

Some or all of the camera 10, the radar device 12, and the finder 14 are an example of a "sensor."

The communication device 20 communicates with another vehicle near the host vehicle M, for example, using a cellular network, a Wi-Fi network, Bluetooth (registered trademark), or dedicated short-range communication (DSRC) or communicates with various server devices via a radio base station.

The HMI 30 presents a variety of information to an occupant of the host vehicle M and receives an input operation from the occupant. The HMI 30 includes various display devices, speakers, buzzers, touch panels, switches, and keys.

The navigation device 50 includes, for example, a global navigation satellite system (GNSS) receiver 51, a navigation HMI 52, and a route determiner 53, and stores first map information 54 in a storage device such as a hard disk drive (HDD) or a flash memory. The GNSS receiver 51 identifies a position of the host vehicle M on the basis of signals received from GNSS satellites. The position of the host vehicle M may be identified or complemented by an inertial navigation system (INS) using an output of the vehicle sensor 70. The navigation HMI 52 includes a display device, a speaker, a touch panel, and keys. The navigation HMI 52 may be wholly or partially common to the HMI 30. The route determiner 53 determines, for example, a route (hereinafter referred to as a route on a map) from the position of the host vehicle M identified by the GNSS receiver 51 (or an input arbitrary position) to a destination input by an occupant using the navigation HMI 52 with reference to the first map information 54. The first map information 54 is, for example, information in which road shapes are expressed by links indicating roads and nodes connected by the links. The first map information 54 may include curvatures of roads or point of interest (POI) information. The route on a map determined by the route determiner 53 is output to the MPU 60. The navigation device 50 may perform route guidance using the navigation HMI 52 on the basis of the route on a map determined by the route determiner 53. The navigation device 50 may be embodied, for example, by a function of a terminal device such as a smartphone or a tablet terminal which is carried by an occupant. The navigation device 50 may transmit the current position and the destination to a navigation server via the communication device 20 and acquire a route on a map returned from the navigation server.

The MPU 60 serves as, for example, a recommended lane determiner 61 and stores second map information 62 in a storage device such as an HDD or a flash memory. The recommended lane determiner 61 divides a route supplied from the navigation device 50 into a plurality of blocks (for example, every 100 [m] in a vehicle traveling direction) and determines a recommended lane for each block with reference to the second map information 62. The recommended lane determiner 61 determines in what lane from the leftmost the vehicle will travel. When a branching point, a merging point, or the like is present in the route, the recommended lane determiner 61 determines a recommended lane such that the host vehicle M travels on a reasonable traveling route for going to divergent destinations.

The second map information 62 is map information with higher precision than the first map information 54. The second map information 62 includes, for example, information of a center of a lane or information of a boundary of a lane. The second map information 62 may include road information, traffic regulation information, address information (addresses and postal codes), establishment information, and phone number information. The second map information 62 may be updated from time to time by accessing another device using the communication device 20.

The vehicle sensor 70 includes a vehicle speed sensor that detects a speed of the host vehicle M, an acceleration sensor that detects an acceleration, a yaw rate sensor that detects an angular velocity around a vertical axis, and a direction sensor that detects a direction of the host vehicle M.

The driving operator 80 includes, for example, an accelerator pedal, a brake pedal, a shift lever, a steering wheel, and other operators. A sensor that detects an amount of operation or performing of an operation is attached to each driving operator 80, and detection results thereof are output to the automated driving control unit 100, the travel driving force output device 200, and one or both of the brake device 210 and the steering device 220.

The automated driving control unit 100 includes, for example, a first control unit 120 and a second control unit 140. The first control unit 120 and the second control unit 140 are an example of a "vehicle controller." The first control unit 120 and the second control unit 140 are embodied by causing a processor such as a central processor (CPU) to execute a program (software). Some or all of functions of the first control unit 120 and the second control unit 140 which will be described below may be embodied by hardware such as a large scale integration (LSI), an application specific integrated circuit (ASIC), a field-programmable gate array (FPGA), or a graphics processor (GPU) or may be embodied in cooperation of software and hardware.

The first control unit 120 includes, for example, an external recognizer 121, a host vehicle position recognizer 122, and a behavior plan generator 123. The behavior plan generator 123 includes a speed determiner 123A and a braking distance estimator 123B.

The external recognizer 121 recognizes states such as positions, speeds, and accelerations of objects near the host vehicle M on the basis of information input from the camera 10, the radar device 12, and the finder 14 via the object recognizing device 16. A position of an object may be indicated by a representative point such as a center or a corner of the object or may be indicated by an expressed area. A "state" of an object may include an acceleration, a jerk, or a "behavior condition" of the object (for example, whether lane change is being performed or is intended). The external recognizer 121 recognizes a shape of a curve through which the host vehicle M will pass from now on based on captured images from the camera 10. The external recognizer 121 converts the shape of the curve from the captured images from the camera 10 onto one on an actual plane and outputs, for example, two-dimensional point sequence information or information which is expressed using a model equivalent thereto as information indicating the shape of the curve to the behavior plan generator 123.

The external recognizer 121 recognizes, for example, a lane in which the host vehicle M is traveling (a traveling lane). For example, the external recognizer 121 recognizes the traveling lane by comparing a pattern of road defining lines (for example, an array of solid lines and dotted lines) acquired from the second map information 62 with a pattern of road defining lines near the host vehicle M which is recognized from an image captured by the camera 10. The external recognizer 121 may recognize the traveling lane by recognizing lane boundaries (road boundaries) including road defining lines, road shoulders, curbstones, median strips, and guard rails instead of recognizing only the road defining lines. The position of the host vehicle M acquired from the navigation device 50 or processing results from the INS may be considered in this recognition. The external recognizer 121 recognizes a stop line, an obstacle, a red signal, a tollgate, and other road events.

The external recognizer 121 derives a recognition accuracy at that time in the process of recognizing a position of an object, a position of a road defining line, or the like, and outputs the derived recognition accuracy as recognition accuracy information to the behavior plan generator 123. For example, the external recognizer 121 generates recognition accuracy information on the basis of the number of times of recognition of a road defining line in a control cycle of a predetermined period. The recognition accuracy information may be generated by comparison with a map. For example, when a stop position, a crossing, a right/left turn road, or the like (an example of a "specific road event") is present at a position which can be imaged by the camera 10 with reference to the second map information 62, but cannot be recognized from a captured image from the camera 10, a recognition accuracy information indicating that recognition accuracy has decreased may be generated. For example, the recognition accuracy information is information in which recognition accuracy is expressed in three levels of "high," "middle," and "low."

Here, a control cycle refers to a reference time point of each process when the vehicle controller repeatedly performs a process. The control cycle may be a time point at which a clock signal is input, a time point at which a clock signal is divided, or a time point at which clock signals or divided signals are subjected to oversampling or downsampling.

Figure 2:
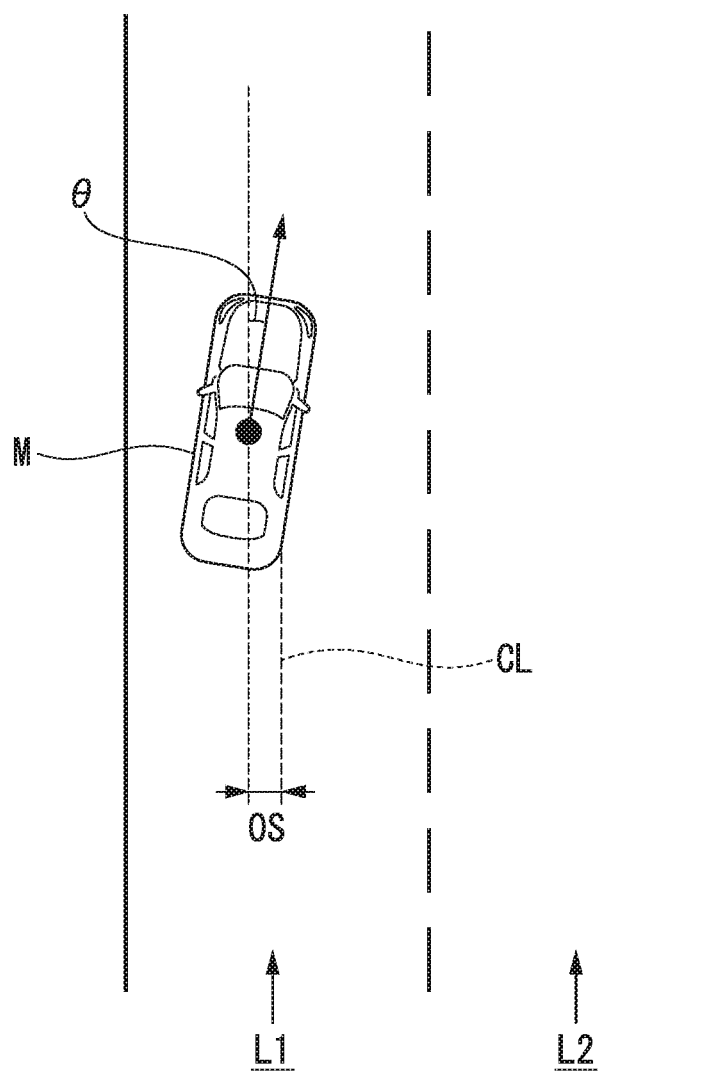
FIG. 2 is a diagram illustrating a state in which a position and a posture of a host vehicle M relative to a traveling lane L1 are recognized by a host vehicle position recognizer 122.

The host vehicle position recognizer 122 recognizes, for example, a position and a posture of the host vehicle M relative to the traveling lane. FIG. 2 is a diagram illustrating a state in which a position and a posture of the host vehicle M relative to the traveling lane L1 are recognized by the host vehicle position recognizer 122. The host vehicle position recognizer 122 recognizes, for example, a separation OS of a reference point (for example, the center of gravity) of the host vehicle M from a traveling lane center CL and an angle θ formed by a traveling direction of the host vehicle M and a line of the traveling lane center CL as a position and a posture of the host vehicle M relative to the traveling lane L1. Instead, the host vehicle position recognizer 122 may recognize a position of the reference point of the host vehicle M relative to one edge of the traveling lane L1 or the like as a position of the host vehicle M relative to the traveling lane. The relative position of the host vehicle M recognized by the host vehicle position recognizer 122 is supplied to the recommended lane determiner 61 and the behavior plan generator 123.

The behavior plan generator 123 determines events which are sequentially performed in automated driving such that the vehicle travels in a recommended lane determined by the recommended lane determiner 61 and it can cope with surrounding conditions of the host vehicle M. Examples of the events include a constant-speed traveling event in which a vehicle travels in the same traveling lane at a constant speed, a following traveling event in which a vehicle follows a preceding vehicle, an overtaking event in which a vehicle overtakes a preceding vehicle, an avoidance event in which a vehicle avoids an obstacle, a curve traveling event in which a vehicle travels in a curved road, a lane change event, a merging event, a branching event, a stopping event, and a takeover event in which automated driving is ended and switched to manual driving. In the course of performing such events, behavior for avoidance may be planned on the basis of surrounding conditions of the host vehicle M (such as presence of a nearby vehicle or a pedestrian and lane narrowing due to road construction).

The behavior plan generator 123 creates a target path in which the host vehicle M will travel in the future. Details of the functional units will be described later. A target path includes, for example, a speed element which is determined by the speed determiner 123A (which will be described later). For example, a target path is expressed as a sequence of points (path points) at which the host vehicle M will arrive. A path point is a point at which the host vehicle M will arrive every predetermined traveling distance (for example, about every several meters) as a road-tracking distance, and a target speed and a target acceleration for each predetermined sampling time (for example, a value about every one tenth of a second [sec]) are generated as a part of a target path separately therefrom. A path point may be a position at which the host vehicle M will arrive at the sampling time for each predetermined sampling period of time. In this case, information of a target speed or a target acceleration is expressed by intervals between the path points.

Figure 3:
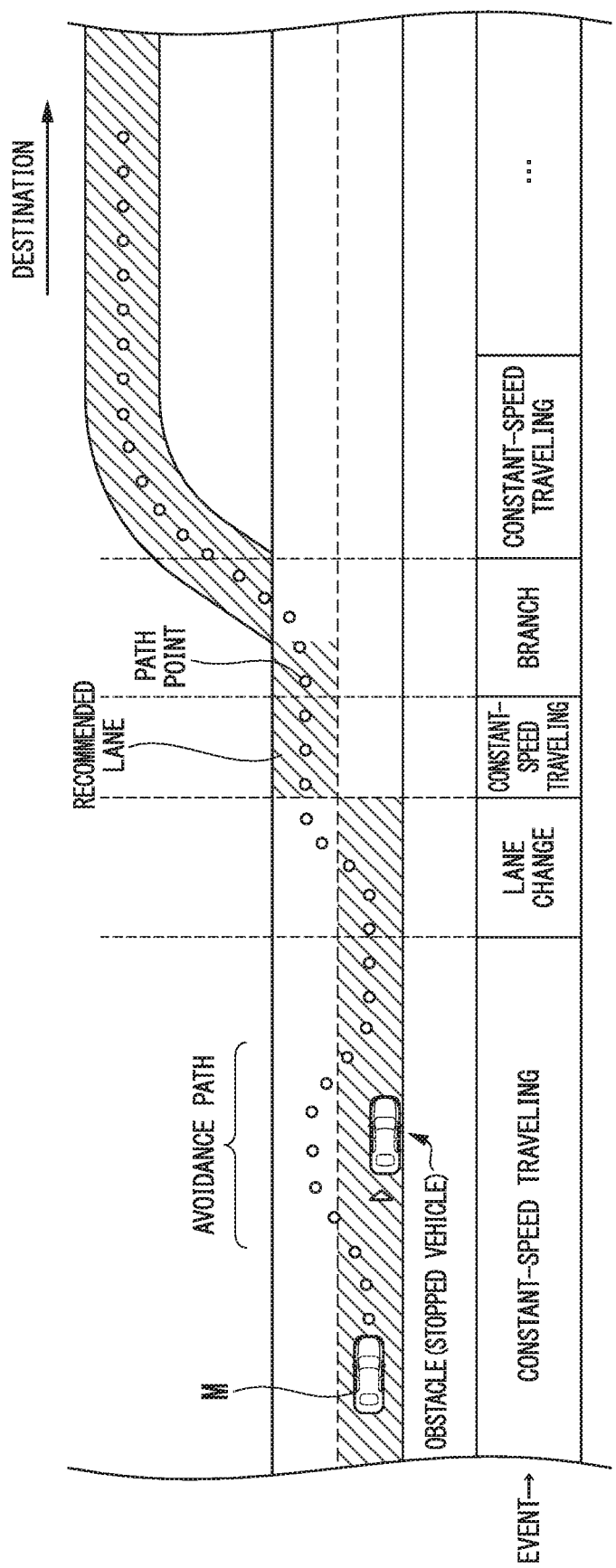
FIG. 3 is a diagram illustrating a state in which a target path is generated on the basis of a recommended lane.

FIG. 3 is a diagram illustrating a state in which a target path is generated on the basis of a recommended lane. As illustrated in the drawing, a recommended lane is set such that it is convenient for traveling along a route to a destination. The behavior plan generator 123 starts a lane change event, a branching event, a merging event, or the like when the host vehicle M reaches a predetermined distance (which may be determined depending on a type of an event) before a changeable point of a recommended lane. When it is necessary to avoid an obstacle during execution of each event, an avoidance path is generated as illustrated in the drawing.

When a curve traveling event is carried out, the behavior plan generator 123 sets a target path on the basis of information included in the second map information 62 or generates a target path on the basis of a recognition result from the external recognizer 121 recognizing the shape of the curve on the basis of a captured image from the camera 10. The former can be performed when information sufficient for the shape of the curve through which the host vehicle M will pass is included in the second map information 62, and the latter can also be performed when sufficient information is not included in the second map information 62.

The second control unit 140 controls the travel driving force output device 200, the brake device 210, and the steering device 220 such that the host vehicle M passes through the target path generated by the behavior plan generator 123 at a scheduled time.

The second control unit 140 includes, for example, an acquisition unit 141, a steering controller 143, a speed controller 144, and an automated stopping controller 145.

The acquisition unit 141 acquires information of the target path (path points) generated by the behavior plan generator 123. The steering controller 143 controls the steering device 220. The speed controller 144 controls the travel driving force output device 200 or the brake device 210 on the basis of a speed element accompanying the target path.

The travel driving force output device 200 outputs a traveling driving force (a torque) for causing a vehicle to travel to driving wheels. The travel driving force output device 200 includes, for example, a combination of an internal combustion engine, an electric motor, and a transmission and an ECU that controls them. The ECU controls the above-mentioned configuration on the basis of information input from the second controller 140 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of information input from the second controller 140 or information input from the driving operator 80 such that a brake torque based on a braking operation is output to vehicle wheels. The brake device 210 may include a mechanism for transmitting a hydraulic pressure generated by an operation of a brake pedal included in the driving operator 80 to the cylinder via the master cylinder as a backup. The brake device 210 is not limited to the above-mentioned configuration, and may be an electronically controlled hydraulic brake device that controls an actuator on the basis of information input from the second controller 140 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of information input from the second controller 140 or information input from the driving operator 80 to change the direction of the turning wheels.

<Speed Control and Automated Stopping Control>

The functions of the speed determiner 123A, the braking distance estimator 123B, the speed controller 144, and the automated stopping controller 145 will be described below. The speed determiner 123A operates mainly in a constant-speed traveling event in which a vehicle travels at a set speed. The speed determiner 123A may perform a process of determining an upper-limit speed in the other events. The braking distance estimator 123B operates mainly in a stopping event. The speed controller 144 controls the travel driving force output device 200 or the brake device 210 on the basis of a target speed determined by the speed determiner 123A. The automated stopping controller 145 performs automated stopping control on the basis of the estimated braking distance estimated by the braking distance estimator 123B.

<Speed Control>

Figure 4:
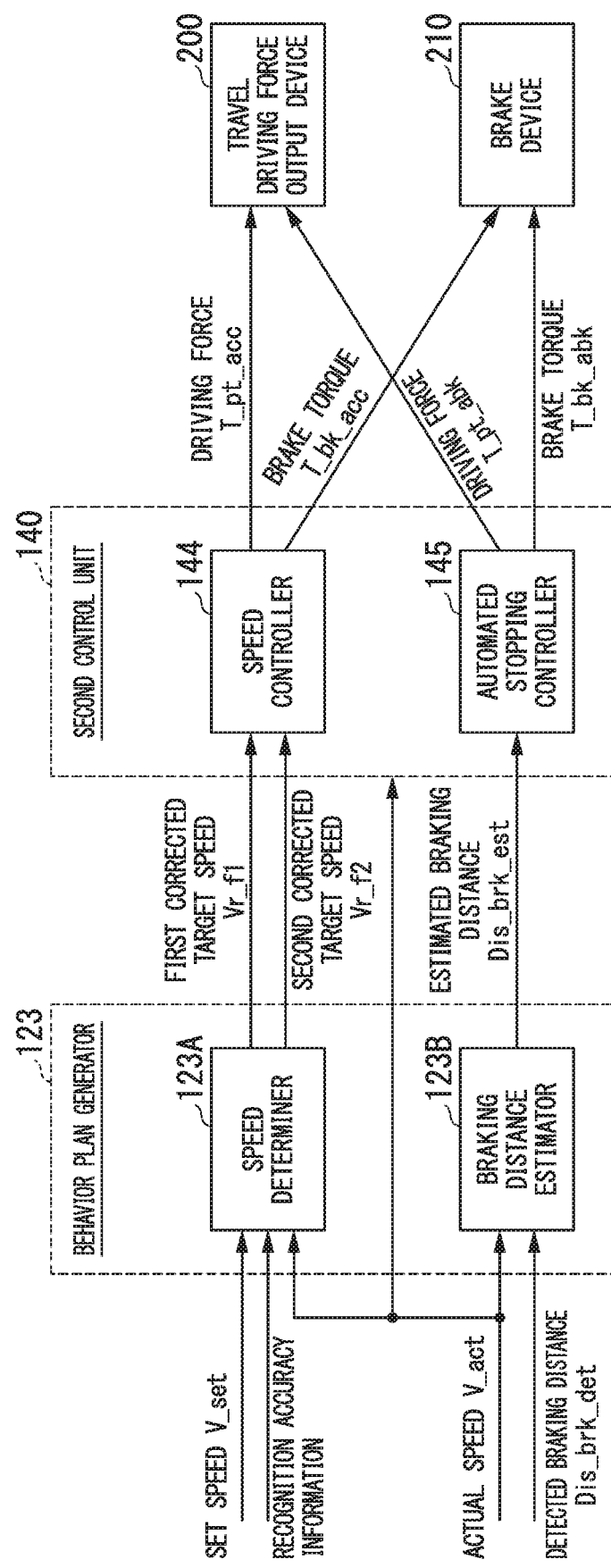
FIG. 4 is a diagram which is used to describe functions of a speed determiner 123A, a braking distance estimator 123B, a speed controller 144, and an automated stopping controller 145.

FIG. 4 is a diagram illustrating the functions of the speed determiner 123A, the braking distance estimator 123B, the speed controller 144, and the automated stopping controller 145.

A set speed V_set, recognition accuracy information, and an actual speed V_act are input to the speed determiner 123A. A set speed V_set refers to a highest speed at which the host vehicle M travels in a state in which there is no specific obstacle and is determined on the basis of a legal speed limit, a speed set by an occupant, or the like. For example, when the legal speed limit is 80 [km/h] and the speed set by an occupant is 70 [km/h], the set speed V_set is 70 [km/h]. The recognition accuracy information is the same as described above. The actual speed V_act is, for example, a value input from a vehicle speed sensor included in the vehicle sensor 70.

Figure 5:
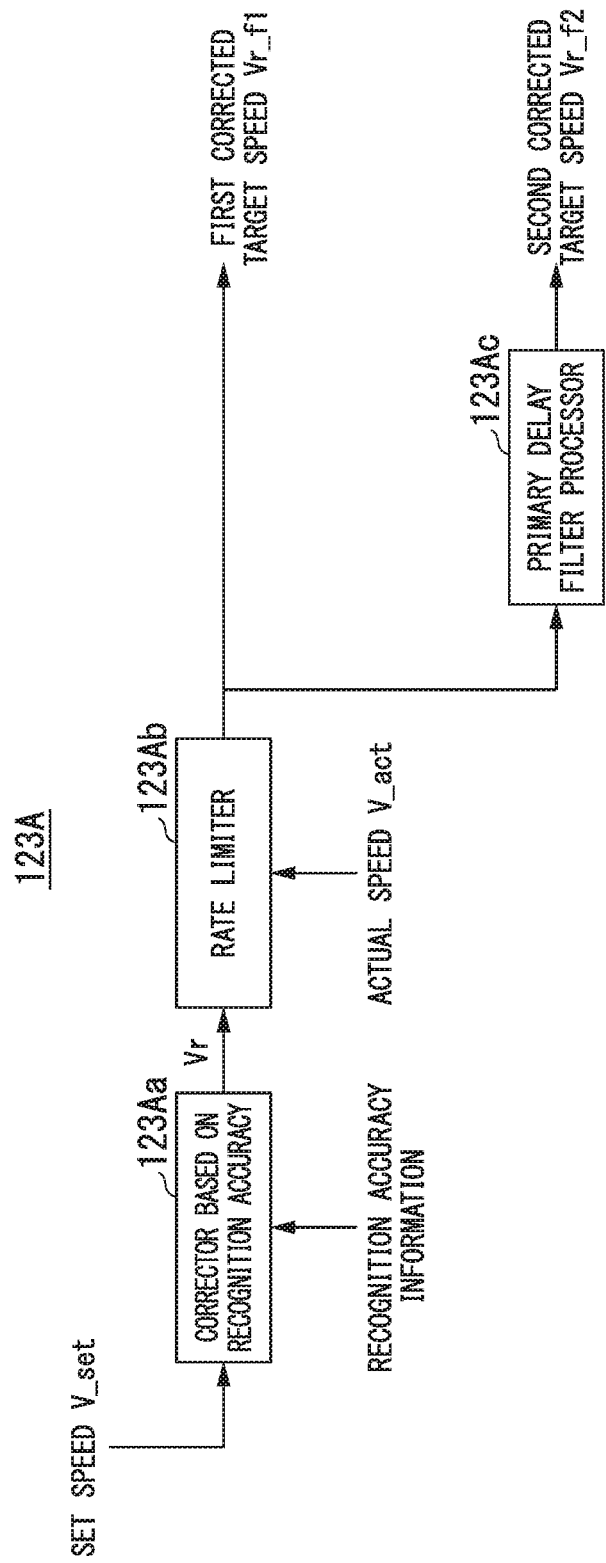
FIG. 5 is a diagram illustrating a functional configuration of the speed determiner 123A.

FIG. 5 is a diagram illustrating the functional configuration of the speed determiner 123A. The speed determiner 123A includes, for example, a correlation unit 123Aa based on recognition accuracy, a rate limiter 123Ab, and a primary delay filter processor 123Ac.

The correlation unit 123Aa based on recognition accuracy corrects the set speed V_set on the basis of the recognition accuracy information. For example, the correlation unit 123Aa based on recognition accuracy corrects the set speed V_set to a smaller value as the recognition accuracy is lowered in such a manner of outputting the set speed V_set without any change when the recognition accuracy is "high," outputting a value obtained by multiplying the set speed V_set by 0.9 when the recognition accuracy is "middle," and outputting a value obtained by multiplying the set speed V_set by 0.75 when the recognition accuracy is "low." The set speed V_set corrected by the correlation unit 123Aa based on recognition accuracy is referred to as a corrected speed Vr.

The rate limiter 123Ab performs, for example, a process of limiting a difference from a value one cycle before to be equal to or less than a predetermined value on the corrected speed Vr, and outputs the process result as a first corrected target speed Vr_f1. A "value predetermined cycles before" may be used instead of the "value one cycle before." Here, when a control cycle when the speed determiner 123A repeatedly performs processing is defined as "k," the first corrected target speed Vr_f1 is expressed by Equation (1). In the equation, α denotes a rate limit value, a relative smaller value α1 is used when the actual speed V_act is less than a threshold value Vth, and a relatively large value α2 (α1<α2) is used when the actual speed V_act is equal to or greater than the threshold value Vth as expressed by Equation (2). The threshold value Vth is, for example, a value of about ten to several tens of [km/h].

$$Vr\_f1 = \text{MIN}(Vr(k), Vr(k-1)+\alpha) \tag{1}$$

$$\alpha = \alpha 1 (V\_act < Vth) = \alpha 2 (V\_act \geq Vth) \tag{2}$$

The primary delay filter unit 123Ac performs a primary delay filter process on the first corrected target speed Vr_f1 and outputs the process result as a second corrected target speed Vr_f2.

Figure 6:
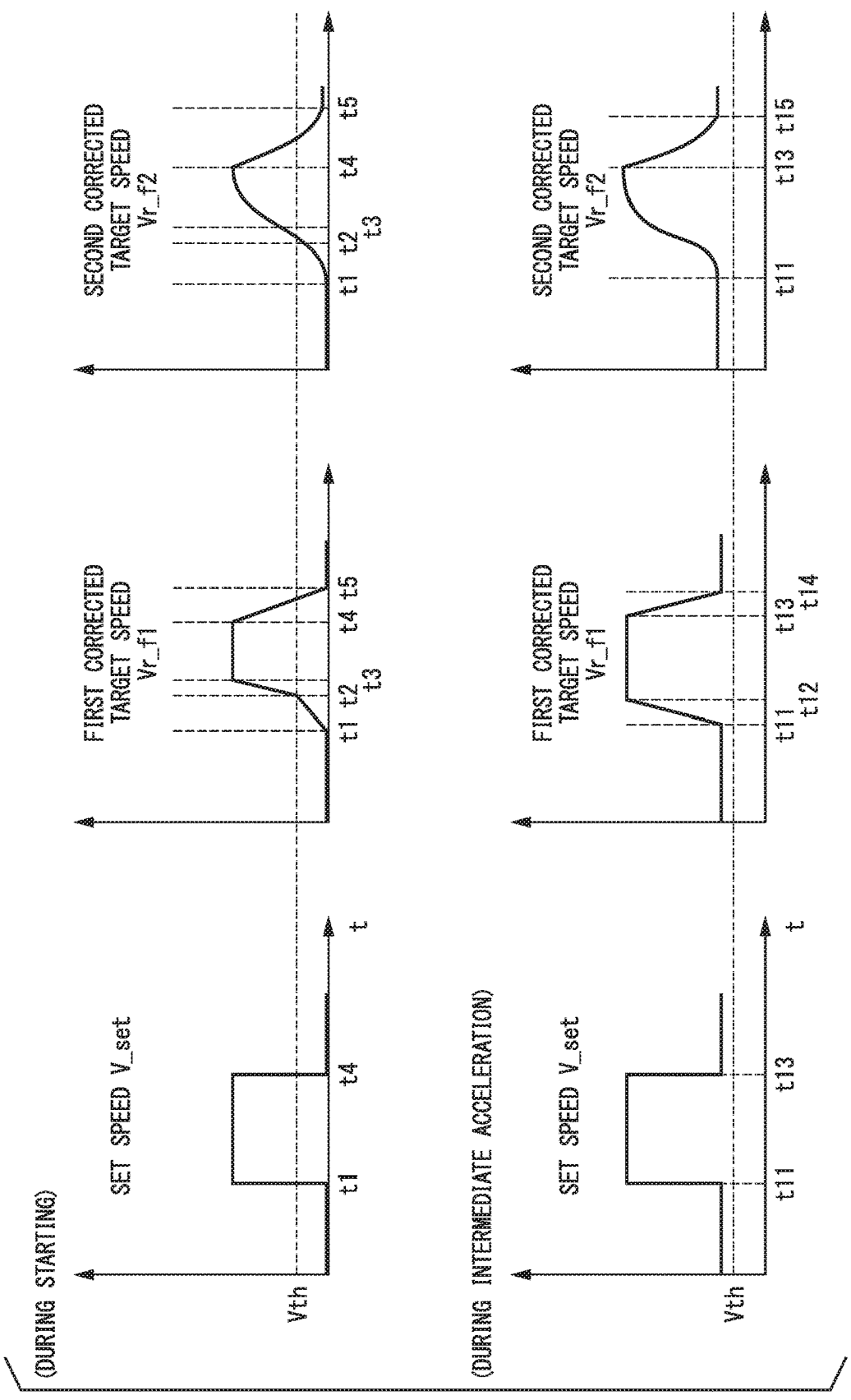
FIG. 6 is a diagram illustrating a first corrected target speed Vr_f1 and a second corrected target speed Vr_f2 which are generated at the time of starting and intermediate acceleration of a vehicle.

FIG. 6 is a diagram illustrating the first corrected target speed Vr_f1 and the second corrected target speed Vr_f2 which are generated when a vehicle starts and accelerates in the middle. As illustrated in the drawing, when the set speed V_set increases at the time of starting, the rate limit value α is α1 which is relatively small in a period (from time t1 to time t2) in which the actual speed V_act is less than the threshold value Vth as for the first corrected target speed Vr_f1 and thus a rate of increase of the first corrected target speed Vr_f1 is smaller than that in a period (from time t2 to time t3) in which the rate limit value α is α2. Accordingly, it is possible to curb behavior such as pitching which is generated in the host vehicle M and to curb a decrease in recognition accuracy of the host vehicle position recognizer 122.

On the other hand, when the set speed V_set increases at the time of accelerating in the middle and the actual speed V_act before acceleration is equal to or greater than the threshold value Vth as for the first corrected target speed Vr_f1, the rate limit value α is kept constant at α2 in a period (from time t11 to time t12) until the vehicle speed reaches the set speed V_set, and thus a rate of increase of the first corrected target speed Vr_f1 is constant.

The second corrected target speed Vr_f2 is obtained by performing the primary delay filter process on the first corrected target speed Vr_f1 and thus indicates a speed increase pattern based on speed change at the time of starting and accelerating in the middle. In the example illustrated in FIG. 6, since acceleration responsiveness of the first corrected target speed Vr_f1 is higher at the time of accelerating in the middle, acceleration responsiveness of the second corrected target speed Vr_f2 is similarly higher at the time of accelerating in the middle.

Figure 7:
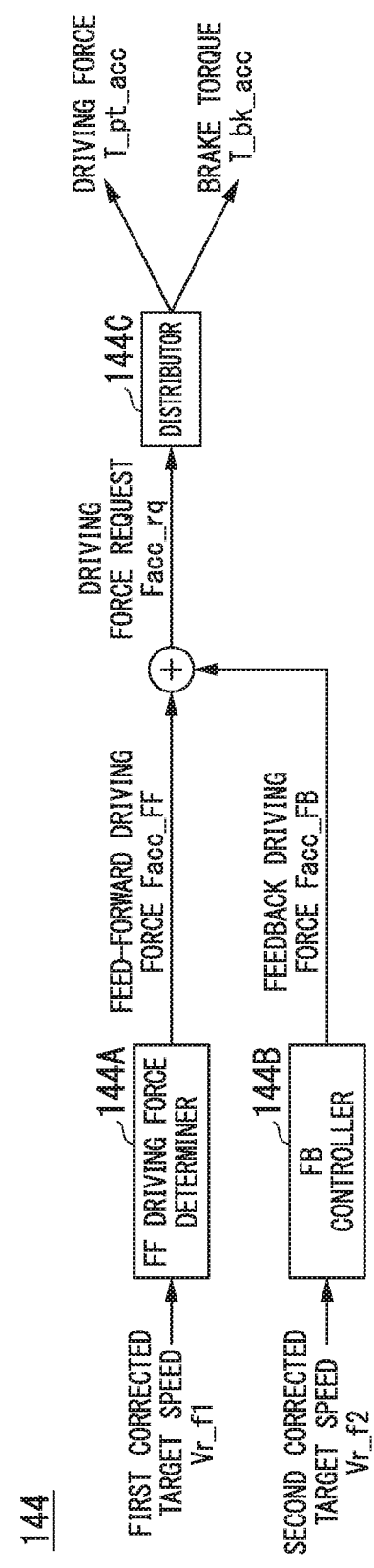
FIG. 7 is a diagram illustrating a functional configuration of the speed controller 144.

FIG. 7 is a diagram illustrating a functional configuration of the speed controller 144. The speed controller 144 includes, for example, a feed-forward (FF) driving force determiner 144A, a feedback (FB) controller 144B, and a distributor 144C.

The FF driving force determiner 144A derives, for example, a driving force balanced with running resistance of a vehicle when the vehicle travels at the first corrected target speed Vr_f1 and outputs the derived driving force as a feed-forward driving force Facc_FF. The feed-forward driving force Facc_FF is derived, for example, on the basis of Equations (3) to (6). Here, Ra denotes air resistance, Rr denotes rolling resistance, and Re denotes gradient resistance. When there is no means for acquiring a gradient, the term of Re may be omitted. λ denotes an air resistance coefficient, S denotes a projected area of a vehicle front surface, μ denotes a rolling resistance coefficient, mw denotes the weight of the host vehicle M, g denotes the gravitational acceleration, and θ denotes a gradient.

$$Facc\_FF = Ra + Rr + Re \tag{3}$$

$$Ra = \lambda \times S \times (Vr\_f1)^2 \tag{4}$$

$$Rr = \mu \times mw \times g \quad (5)$$

$$Re = mw \times g \times \sin\theta \quad (6)$$

On the other hand, the FB controller 144B operates, for example, as a sliding-mode controller, and determines and outputs a feedback driving force Facc_FB by sliding mode control. The FB controller 144B may operate, for example, a simple sliding-mode controller (SMC) or an SMC with an adaptive disturbance observer. The simple SMC can achieve curbing of overshooting or vibrational behavior through a simpler process than that in PID control. The SMC with an adaptive disturbance observer is more excellent in ability of curbing overshooting or vibrational behavior.

When the FB controller 144B operates as a simple SMC, the FB controller 144B performs feedback control on the second corrected target speed Vr_f2(k) such that a state in which a changeover function σ(k) expressed by Equation (7) is zero is maintained. In the equation, E denotes a deviation between the second corrected target speed Vr_f2 and the actual speed V_act. Here, n denotes a changeover function time difference and has a value corresponding to, for example, three to eight control cycles. The state in which the changeover function σ(k) is zero refers to a state in which a change of the deviation E over time is in a changeover straight line expressed by E(k)=−S×E(k−n). In the equation, S denotes a changeover function parameter and has a value between −1 and 0.

$$\sigma(k) = E(k) + S \times E(k-n) \quad (7)$$

The FB controller 144B calculates the feedback driving force Facc_FB(t) on the basis of Equation (8). In the equation, Urch(k) denotes a reach rule input and is expressed by Equation (9). Uadp(k) denotes an adaptation rule input and is expressed by Equation (10). Krch and Kadp denote feedback coefficients having a negative value. In this way, the FB controller 144B performs control for decreasing a separation from the changeover straight line.

$$\text{Facc\_FB}(k) = Urch(k) + Uadp(k) \quad (8)$$

$$Urch(k) = Krch \times \sigma(k) \quad (9)$$

$$Uadp(k) = \sum_{j=1}^{k} Kadp \times \sigma(j) \quad (10)$$

When the FB controller 144B operates as an SMC with an adaptive disturbance observer, the FB controller 144B calculates the feedback driving force Facc_FB(k) on the basis of Equation (11) instead of Equation (8). In the equation, Ueq(k) denotes an equivalent control input and is expressed by Equation (12). In the equation, a1, a2, and b1 denote parameters of a deviation model which is expressed by Equation (13). S denotes a changeover function parameter.

$$\text{Facc\_FB}(k) = Urch(k) + Ueq(k) \quad (11)$$

$$Ueq(k) = (1/b1) \times \{(1-s-a1) \times E(k) + (s-a2) \times E(k-1) - c1(k)\} \quad (12)$$

$$E(k+1) = a1 \times E(k) + b1 \times E(k-1) + b1 + \text{Facc\_FB}(k) \quad (13)$$

Here, c1(k) in Equation (12) is an estimated adaptive disturbance value which is expressed by Equation (14). In the equation, Kid is a coefficient and E_id(k) denotes an identification error which is expressed by Equation (15). E_hat(k) in Equation (15) denotes an estimated deviation value which is defined by Equation (16).

$$c1(k) = c1(k-1) + Kid \times E = id(k) \quad (14)$$

$$E\_id(k) = E\_hat(k) - E(k) \quad (15)$$

$$E\_hat(k) = a1 \times E(k-1) + b1 \times E(k-2) + b1 \times \text{Facc\_FB}(k) + c1(k-1) \quad (16)$$

The distributor 144C distributes a driving force request Facc_rq, which is obtained by adding the feed-forward driving force Facc_FF output from the FF driving force determiner 144A and the feedback driving force Facc_FB output from the FB controller 144B, into a driving force T_pt_acc which is applied to the travel driving force output device 200 and a brake torque T_bk_acc which is applied to the brake device 210. Specifically, the distributor 144C assigns the driving force request Facc_rq to the driving force T_pt_acc when the driving force request Facc_rq has a positive value (that is, when it is an acceleration request) or a negative value of which the absolute value which can be realized by an engine brake or the like is small (that is, when it is a relatively small deceleration request), and assigns at least a part of the driving force request Facc_rq to the brake torque T_bk_acc otherwise.

As described above, in the vehicle controller according to the embodiment, when the recognition accuracy indicated by the recognition accuracy information decreases, the target speed Vr of the host vehicle M is determined to be a speed lower than the set speed V_set. As a result, it is possible to appropriately limit the speed on the basis of whether surrounding conditions have been accurately recognized.

[(First) Estimation of Braking Distance]

Figure 8:
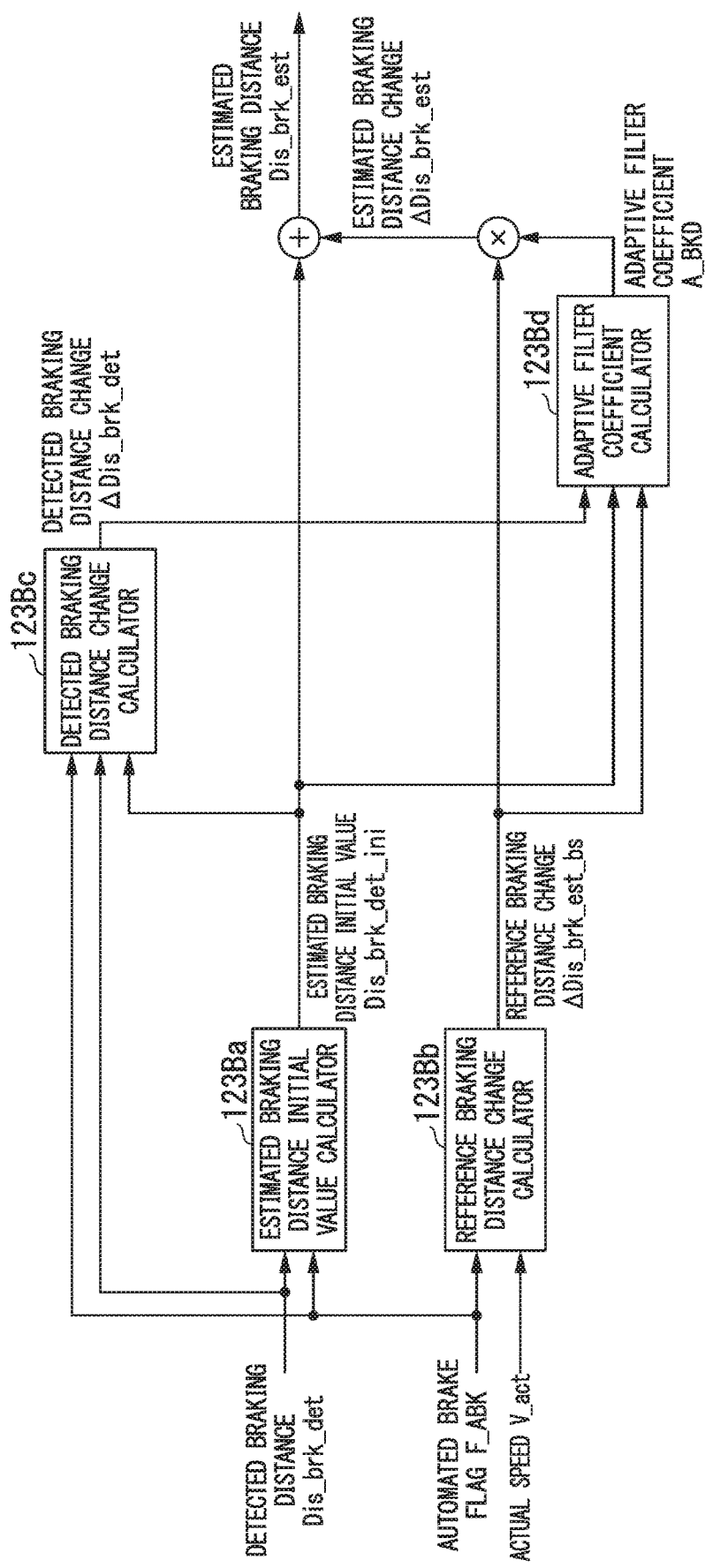
FIG. 8 is a (first) diagram illustrating a configuration of the braking distance estimator 123B.

FIG. 8 is a (first) diagram illustrating the configuration of the braking distance estimator 123B. There are two patterns in the functions of the braking distance estimator 123B described in this embodiment, and the configuration illustrated in FIG. 8 among the patterns is referred to as a braking distance estimator 123B(1). The braking distance estimator 123B(1) includes, for example, an estimated braking distance initial value calculator 123Ba, a reference braking distance change calculator 123Bb, a detected braking distance change calculator 123Bc, and an adaptive filter coefficient calculator 123Bd.

A detected braking distance Dis_brk_det and an automated brake flag F_ABK are input to the estimated braking distance initial value calculator 123Ba.

The detected braking distance Dis_brk_det is a distance to a stop position which is detected by the external recognizer 121 or the host vehicle position recognizer 122. A stop position is a position before a stop line, an obstacle, a red signal, a tollgate, and other road events. The external recognizer 121 or the host vehicle position recognizer 122 detects such a road event on the basis of captured images from the camera 10, detects a distance from the host vehicle M to the stop position, and outputs the detected distance to the behavior plan generator 123. This is the detected braking distance Dis_brk_det.

The automated brake flag F_ABK is flag information indicating whether automated braking control has to be performed by the braking distance estimator 123B or the automated stopping controller 145. Automated braking control is performed when the automated brake flag F_ABK is 1, and automated braking control is not performed when the automated brake flag F_ABK is 0. The automated brake flag F_ABK is set by the behavior plan generator 123. This will be described later.

The estimated braking distance initial value calculator 123Ba calculates an estimated braking distance initial value Dis_brk_det_ini(k) on the basis of the detected braking distance Dis_brk_det and the automated brake flag F_ABK. When a stop position is detected by the external recognizer 121 or the host vehicle position recognizer 122 and a distance to the stop position (for example, a value of 40 [m]) is detected, the estimated braking distance initial value Dis_brk_det_ini(k) is set to the same value until automated braking control ends. A value acquired through any statistical processing on the basis of a certain detected value may be used as the estimated braking distance initial value Dis_brk_det_ini(k). A time point at which the stop position is detected at the first time is an example of a predetermined time point. Automated braking control ends when the host vehicle M stops at the stop position as a target or other interruption conditions are satisfied. The estimated braking distance initial value calculator 123Ba calculates the estimated braking distance initial value Dis_brk_det_ini(k), for example, on the basis of Equation (17).

$$\text{Dis\_brk\_det\_ini}(k) = \begin{cases} \text{Dis\_brk\_det}(k) & (\text{F\_ABK}(k) = 1 \text{ and } \text{F\_ABK}(k-1) = 0) \\ \text{Dis\_brk\_det}(k-1) & (\text{F\_ABK}(k) = 1 \text{ and } \text{F\_ABK}(k-1) = 1) = \text{Dis\_brk\_det\_ini}(k)) \\ 0 & (\text{F\_ABK}(k) = 0) \end{cases} \quad (17)$$

A method of setting the automated brake flag F_ABK will be described below. The behavior plan generator 123 sets the automated brake flag F_ABK, for example, on the basis of Equation (18). For the purpose of convenience, it is premised that the detected braking distance Dis_brk_det is set to a predetermined minus value when a stop position is not detected by the external recognizer 121 or the host vehicle position recognizer 122. A condition for F_ABK=1 in the uppermost part of Equation (18) is that a stop position has not been detected up to the previous control cycle (thus, the detected braking distance Dis_brk_det(k−1) has a minus value), a stop position has been detected in the current control cycle (thus the detected braking distance Dis_brk_det(k) has a plus value), and a road event corresponding to the stop position is present on the first map information 54 or the second map information 62. When the automated brake flag F_ABK(k) is set to 1, the automated brake flag F_ABK(k+i) is maintained at 1 in a subsequent control cycle k+i, except a case in which a road event corresponding to the stop position is not present on the first map information 54 or the second map information 62.

gration with a traveling distance between the control cycles (k) and (k−1) as a negative value.

$$\Delta\text{Dis\_brk\_est\_bs}(k) = \begin{cases} \Delta\text{Dis\_brk\_est\_bs}(k-1) - V\_\text{act}(k)\Delta T & (\text{F\_ABK}(k) = 1) \\ 0 & (\text{F\_ABK}(k) = 0) \end{cases} \quad (19)$$

The detected braking distance Dis_brk_det, the automated brake flag F_ABK, and the estimated braking distance initial value Dis_brk_det_ini calculated by the estimated braking distance initial value calculator 123Ba are input to the detected braking distance change calculator 123Bc. The detected braking distance change calculator 123Bc calculates a detected braking distance change ΔDis_brk_det(k), for example, on the basis of Equation (20). Here, since the estimated braking distance initial value Dis_brk_det_ini(k) does not change during automated braking control, the detected braking distance change ΔDis_brk_det(k) has a negative value of which the absolute value increases gradually as the detected braking distance Dis_brk_det(k) decreases with traveling of the host vehicle M. When the detected braking distance Dis_brk_det(0) is assumed to be 40 [m], the detected braking distance change ΔDis_brk_det (k) has a value which starts from zero and decreases monotonously before and after −40 [m].

$$\Delta\text{Dis\_brk\_det}(k) = \begin{cases} \text{Dis\_brk\_det}(k) - \text{Dis\_brk\_det\_ini}(k) & (\text{F\_ABK}(k) = 1) \\ 0 & (\text{F\_ABK}(k) = 0) \end{cases} \quad (20)$$

The estimated braking distance initial value Dis_brk_det_ini(k) calculated by the estimated braking distance initial value calculator 123Ba, the reference braking distance change ΔDis_brk_est_bs(k) calculated by the reference braking distance change calculator 123Bb, and the detected $$\text{F\_ABK}(k) = \begin{cases} 1: \begin{pmatrix} \text{Dis\_brk\_det\_ini}(k) - \text{Dis\_brk\_det\_ini}(k-1) > \text{SET VALUE} \\ \text{and} \\ \text{Dis\_brk\_det\_ini}(k) > \text{SET VALUE} \\ \text{and} \\ \text{THE STOP POSITION IS PRESENT ON MAP} \end{pmatrix} \\ 0: (\text{THE STOP POSITION IS NOT PRESENT ON MAP}) \\ \text{F\_ABK}(k-1)(\text{OTHER CASES}) \end{cases} \quad (18)$$

The automated brake flag F_ABK and the actual speed V_act are input to the reference braking distance change calculator 123Bb. The reference braking distance change calculator 123Bb calculates a reference braking distance change ΔDis_brk_est_bs(k), for example, on the basis of Equation (19). In the equation, ΔT denotes a control period and is a time period between the control cycles (k) and (k−1). The reference braking distance change ΔDis_brk_est_bs(k) is an integrated value obtained by intebraking distance change ΔDis_brk_det(k) calculated by the detected braking distance change calculator 123Bc are input to the adaptive filter coefficient calculator 123Bd. The adaptive filter coefficient calculator 123Bd calculates an adaptive filter coefficient A_BKD(k), for example, using an algorithm for minimizing the square value of an identification error E_BKD (for example, a sequential least square method or a fixed gain method) with a deviation between the detected braking distance change ΔDis_brk_det and the estimated braking distance change ΔDis_brk_est as the identification error E_BKD.

The adaptive filter coefficient A_BKD(k) has a value which is adjusted such that the identification error E_BKD indicating a separation between the detected braking distance change ΔDis_brk_denk) and the reference braking distance change ΔDis_brk_est_bs(k), that is, a separation between a change of a detected distance through captured image analysis of the camera 10 and a change of a reference braking distance based on integration of the actual speed V_act, is cancelled and varies with respect to 1.

The adaptive filter coefficient calculator 123Bd calculates the identification error E_BKD_id(k), for example, on the basis of Equations (21) and (22). In the equations, Lim( ) denotes a limit function that limits an upper limit value. A degree of influence of a fluctuating component of the detected braking distance Dis_brk_det on the adaptive filter coefficient A_BKD can be limited by the limit function. Accordingly, it is possible to prevent automated braking control from excessively following shaking of a captured image from the camera 10 due to pitching of the host vehicle M, for example, based on a brake output. In Equation (22), the threshold value Dth is a distance of, for example, about 5 [m]. This distance is a distance limit at which a stop line or the like cannot be recognized in the captured image from the camera 10 due to presence of an engine hood or the like. The adaptive filter coefficient calculator 123Bd stops updating of the adaptive filter coefficient A_BKD(k) when the detected braking distance Dis_brk_det becomes equal to or less than the threshold value Dth. That is, the adaptive filter coefficient calculator 123Bd repeatedly determines whether the detected braking distance Dis_brk_det is equal to or less than the threshold value Dth, and stops updating of the adaptive filter coefficient A_BKD(k) when the detected braking distance Dis_brk_det is equal to or less than the threshold value Dth.

$$E\_BKD\_id\_tmp(k) = \quad (21)$$
$$A\_BKD(k-1) \times \Delta\_Dis\_brk\_est\_bs(k) - \Delta\_Dis\_brk\_det(k)$$

$$E\_BKD\_id(k) = \quad (22)$$
$$\begin{cases} Lim(E\_BKD\_id\_tmp(k)) & (Dis\_brk\_det(k) > Dth) \\ 0 & (Dis\_brk\_det(k) \leq Dth) \end{cases}$$

The adaptive filter coefficient calculator 123Bd calculates a parameter update gain KP(k), for example, on the basis of Equation (23), and calculates an adjusted adaptive filter coefficient value dA_BKD(k), for example, on the basis of Equation (24) using the identification error E_BKD_id(k) and the parameter update gain KP(k). The adjusted adaptive filter coefficient value dA_BKD(k) is an integrated value of a value obtained by multiplying the identification error E_BKD_id(k) by the parameter update gain KP(k).

$$KP(k) = P\Delta\_Dis\_brk\_est\_bs(k)/(1 + P\Delta\_Dis\_brk\_est\_bs^2(k)) \quad (23)$$

$$dA\_BKD(k) = \quad (24)$$
$$\begin{cases} dA\_BKD(k-1) + KP(k)E\_BKD\_id(k) & (F\_ABK(k) = 1) \\ 0 & (F\_ABK(k) = 0) \end{cases}$$

The adaptive filter coefficient calculator 123Bd calculates the adaptive filter coefficient A_BKD(k) by adding 1 to the adjusted adaptive filter coefficient value dA_BKD(k) as expressed by Equation (25).

$$A\_BKD(k) = 1 + dA\_BKD(k) \quad (25)$$

The braking distance estimator 123B(1) calculates the estimated braking distance change ΔDis_brk_est by multiplying the reference braking distance change ΔDis_brk_est_bs(k) by the adaptive filter coefficient A_BKD. Then, the braking distance estimator 123B(1) calculates the estimated braking distance Dis_brk_det by adding the estimated braking distance change ΔDis_brk_est to the estimated braking distance initial value Dis_brk_det_ini, and outputs the calculated estimated braking distance Dis_brk_est to the automated stopping controller 145. Since the reference braking distance change ΔDis_brk_est_bs(k) is an integrated value calculated with a traveling distance between the control cycle (k) and the control cycle (k−1) as a negative value, the estimated braking distance Dis_brk_est is a distance which is obtained by subtracting a value, which is obtained by multiplying the traveling distance integrated value in each control cycle by the adaptive filter coefficient A_BKD(k), from the estimated braking distance initial value Dis_brk_det_ini.

[(Second) Estimation of Braking Distance]

Figure 9:
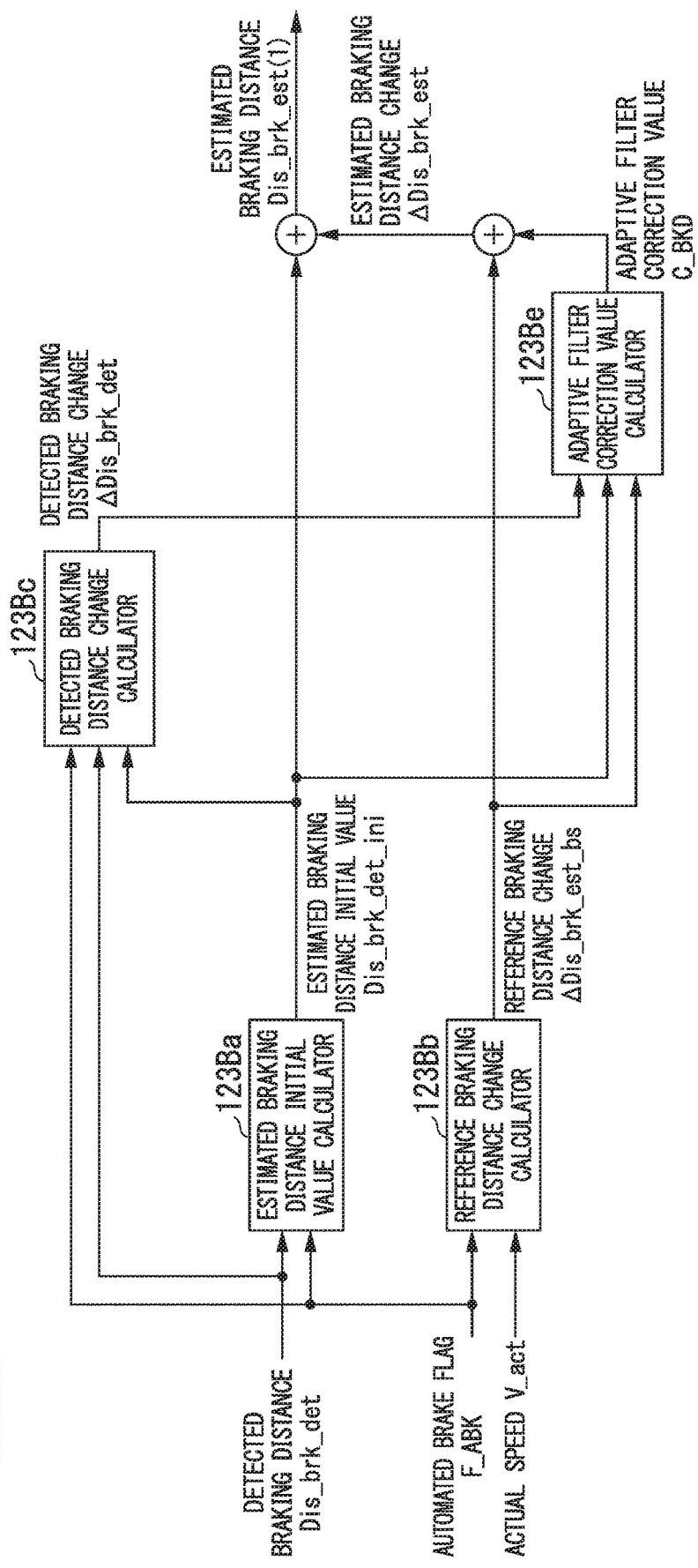
FIG. 9 is a (second) diagram illustrating a configuration of the braking distance estimator 123B.

FIG. 9 is a (second) diagram illustrating the configuration of the braking distance estimator 123B. The configuration illustrated in FIG. 9 is referred to as an braking distance estimator 123B(2). Here, the functions of the estimated braking distance initial value calculator 123Ba, the reference braking distance change calculator 123Bb, and the detected braking distance change calculator 123Bc are the same as illustrated in FIG. 8 and thus description thereof will not be repeated. The braking distance estimator 123B(2) includes an adaptive filter correction value calculator 123Be instead of the adaptive filter coefficient calculator 123Bd illustrated in FIG. 8.

The estimated braking distance initial value Dis_brk_det_ini(k) calculated by the estimated braking distance initial value calculator 123Ba, the reference braking distance change ΔDis_brk_est_bs(k) calculated by the reference braking distance change calculator 123Bb, and the detected braking distance change ΔDis_brk_denk) calculated by the detected braking distance change calculator 123Bc are input to the adaptive filter correction value calculator 123Be. The adaptive filter correction value calculator 123Be calculates an adaptive filter correction value C_BKD(k), for example, using an algorithm for minimizing the square value of the identification error E_BKD (for example, a sequential least square method or a fixed gain method) with a deviation between the detected braking distance change ΔDis_brk_det and the estimated braking distance change ΔDis_brk_est as the identification error E_BKD.

The adaptive filter correction value C_BKD(k) has a value which is adjusted such that the identification error E_BKD_id(k) indicating a separation between the detected braking distance change ΔDis_brk_denk) and the reference braking distance change ΔDis_brk_est_bs(k), that is, a separation between a change of a detected distance through captured image analysis of the camera 10 and a change of a reference braking distance based on integration of the actual speed V_act, is cancelled.

The adaptive filter correction value calculator 123Be calculates the identification error E_BKD_id(k), for example, on the basis of Equations (26) and (27). In the equations, Lim( ) denotes a limit function that limits an upper limit value. A degree of influence of a fluctuating component of the detected braking distance Dis_brk_det on the adaptive filter correction value C_BKD(k) can be limited by the limit function. Accordingly, it is possible to prevent automated braking control from excessively following shaking of a captured image from the camera 10 due to pitching of the host vehicle M, for example, based on a brake output. In Equation (27), the threshold value Dth is a distance of, for example, about 5 [m]. This distance is a distance limit at which a stop line or the like cannot be recognized in the captured image from the camera 10 due to presence of an engine hood or the like. The adaptive filter coefficient calculator 123Bd stops updating of the adaptive filter correction value C_BKD(k) when the detected braking distance Dis_brk_det becomes equal to or less than the threshold value Dth. That is, the adaptive filter correction value calculator 123Be repeatedly determines whether the detected braking distance Dis_brk_det is equal to or less than the threshold value Dth, and stops updating of the adaptive filter correction value C_BKD(k) when the detected braking distance Dis_brk_det is equal to or less than the threshold value Dth.

$$E\_BKD\_id\_tmp(k) = \Delta\_Dis\_brk\_est\_bs(k) + C\_BKD(k-1) - \Delta\_Dis\_brk\_det(k) \quad (26)$$

$$E\_BKD\_id(k) = \begin{cases} \text{Lim}(E\_BKD\_id\_tmp(k)) & (Dis\_brk\_det(k) > Dth) \\ 0 & (Dis\_brk\_det(k) \leq Dth) \end{cases} \quad (27)$$

The adaptive filter correction value calculator 123Be calculates the adaptive filter correction value C_BKD(k), for example, on the basis of Equation (29) using the identification error E_BKD_id(k) and the parameter update gain KP which is calculated on the basis of Equation (28).

$$KP = P/(1 + P) \quad (28)$$

$$C\_BKD(k) = \begin{cases} C\_BKD(k-1) + KP\, E\_BKD\_id(k) & (F\_ABK(k) = 1) \\ 0 & (F\_ABK(k) = 0) \end{cases} \quad (29)$$

The braking distance estimator 123B(2) calculates the estimated braking distance change ΔDis_brk_est by adding the adaptive filter correction value C_BKD to the reference braking distance change ΔDis_brk_est_bs(k), that is, the traveling distance integrated value. Then, the braking distance estimator 123B(2) calculates the estimated braking distance Dis_brk_est by adding the estimated braking distance change ΔDis_brk_est to the estimated braking distance initial value Dis_brk_det_ini, and outputs the calculated estimated braking distance Dis_brk_est to the automated stopping controller 145. Since the reference braking distance change ΔDis_brk_est_bs(k) is an integrated value calculated with a traveling distance between the control cycle (k) and the control cycle (k−1) as a negative value, the estimated braking distance Dis_brk_est is a distance which is obtained by subtracting a value, which is obtained by subtracting the adaptive filter correction value C_BKD from the traveling distance integrated value in each control cycle, from the estimated braking distance initial value Dis_brk_det_ini. The sign of the adaptive filter correction value C_BKD may be inverted. In this case, the estimated braking distance Dis_brk_est is a distance obtained by subtracting a value, which is obtained by adding the adaptive filter correction value C_BKD to the traveling distance integrated value in each control cycle, from the estimated braking distance initial value Dis_brk_det_ini.

Figure 10:
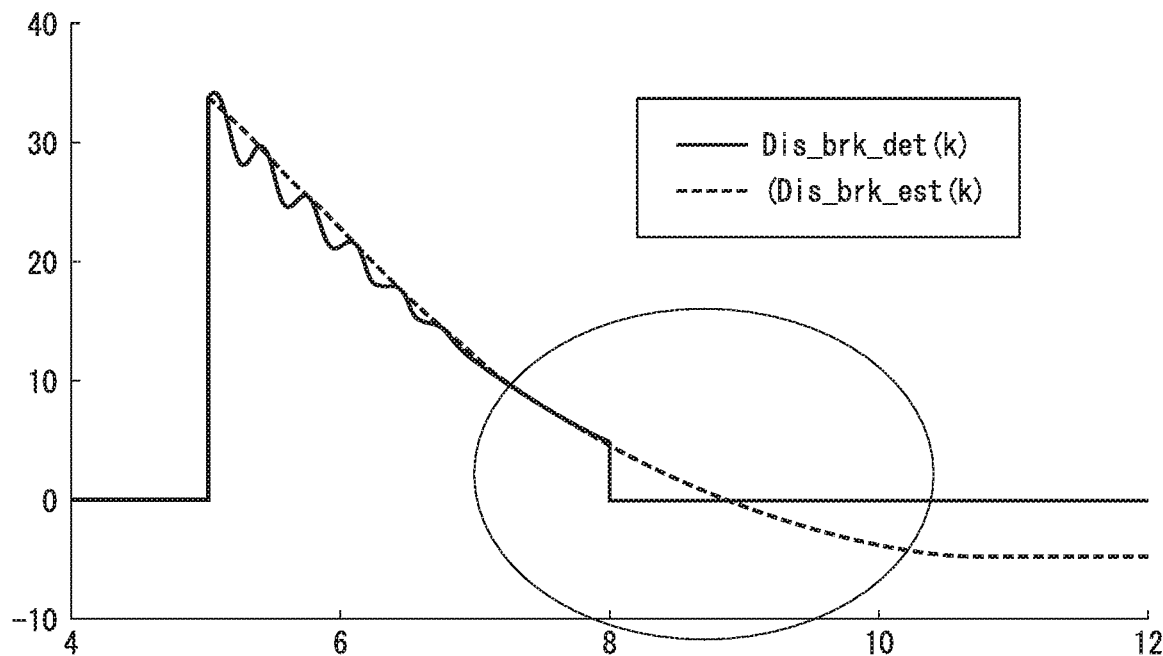
FIG. 10 is a diagram illustrating change of a detected braking distance Dis_brk_det(k) and an estimated braking distance Dis_brk_est(k) over time in the embodiment.

FIG. 10 is a diagram illustrating changes of the detected braking distance Dis_brk_det(k) and the estimated braking distance Dis_brk_est(k) over time in the embodiment. In FIG. 10, the horizontal axis represents the time. As illustrated in the drawing, the detected braking distance Dis_brk_det(k) includes a fluctuating component which fluctuates due to pitching based on braking of the host vehicle, but the braking distance estimator 123B can smoothly correct the fluctuating component using the adaptive filter coefficient A_BKD or the adaptive filter coefficient value C_BKD(k). Accordingly, it is possible to enable the automated stopping controller 145 to perform smooth automated braking control.

The detected braking distance Dis_brk_det(k) becomes zero or vanishes at levels which are less than the threshold value Dth, but the braking distance estimator 123B fixes at the levels which are less than the threshold value Dth and thus calculates the estimated braking distance Dis_brk_est using only the reference braking distance change ΔDis_brk_est_bs(k) when the distance to the stop position is less than the threshold value Dth. Accordingly, it is possible to enable the automated stopping controller 145 to smoothly decelerate the host vehicle M until the host vehicle M stops.

Figure 11:
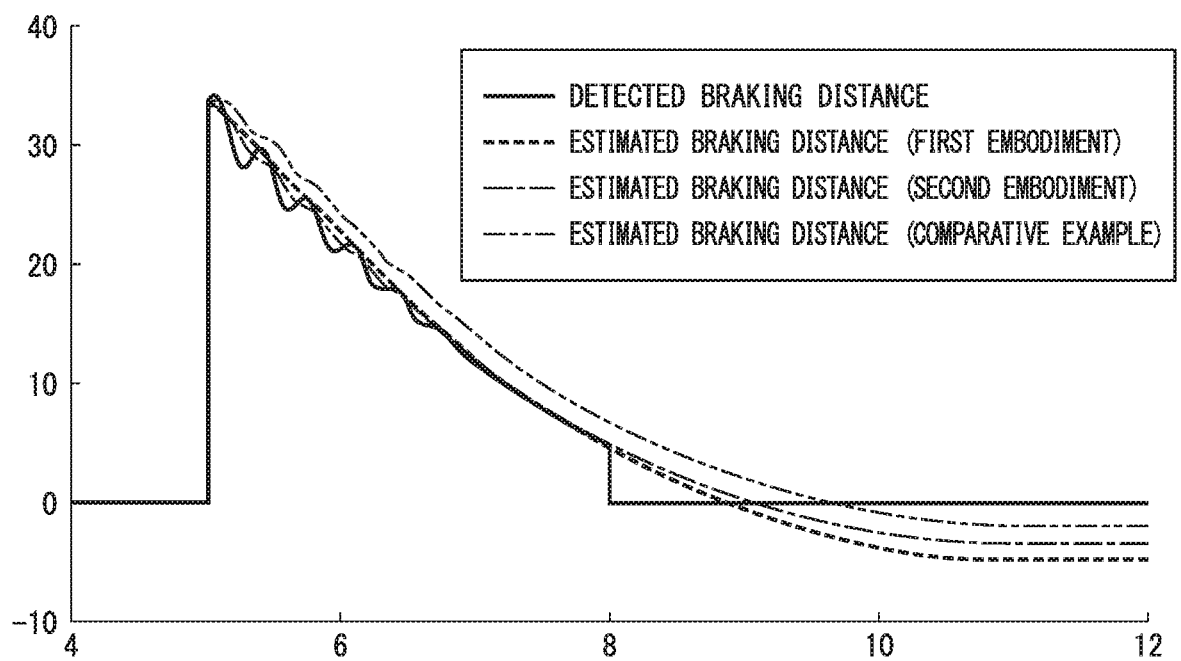
FIG. 11 is a diagram illustrating change of an estimated braking distance over time in the braking distance estimator 123B (first and second embodiments) and a comparative example.

FIG. 11 is a diagram illustrating a change of estimated braking distance over time in the braking distance estimator 123B(1, 2) in the embodiment and a comparative example. In FIG. 11, the horizontal axis represents the time. The method according to the comparative example, a fluctuating component is curbed by applying a filtering process such as a primary delay filter on the detected braking distance Dis_brk_det(k). In the method according to the comparative example, when it is intended to satisfactorily remove the fluctuating component of the detected braking distance Dis_brk_det(k), a delay due to the filtering process increases and the estimated braking distance cannot satisfactorily track the change of the actual braking distance, and thus a delay may occur in a braking operation. On the other hand, in the braking distance estimator 123B(1, 2) according to the embodiment, the fluctuating component of the detected braking distance Dis_brk_det(k) is curbed to realize smooth stopping and to improve trackability to the change of the actual braking distance. As a result, it is possible to cause the host vehicle M to stop more accurately at the stop position. The separation in a steady state in FIG. 11 denotes a relative error when the detected braking distance Dis_brk_det(k) is set to zero.

As described above, the vehicle controller according to the embodiment can cause the host vehicle M to stop more accurately at a stop position by smooth deceleration.

[Automated Stopping Control]

Figure 12:
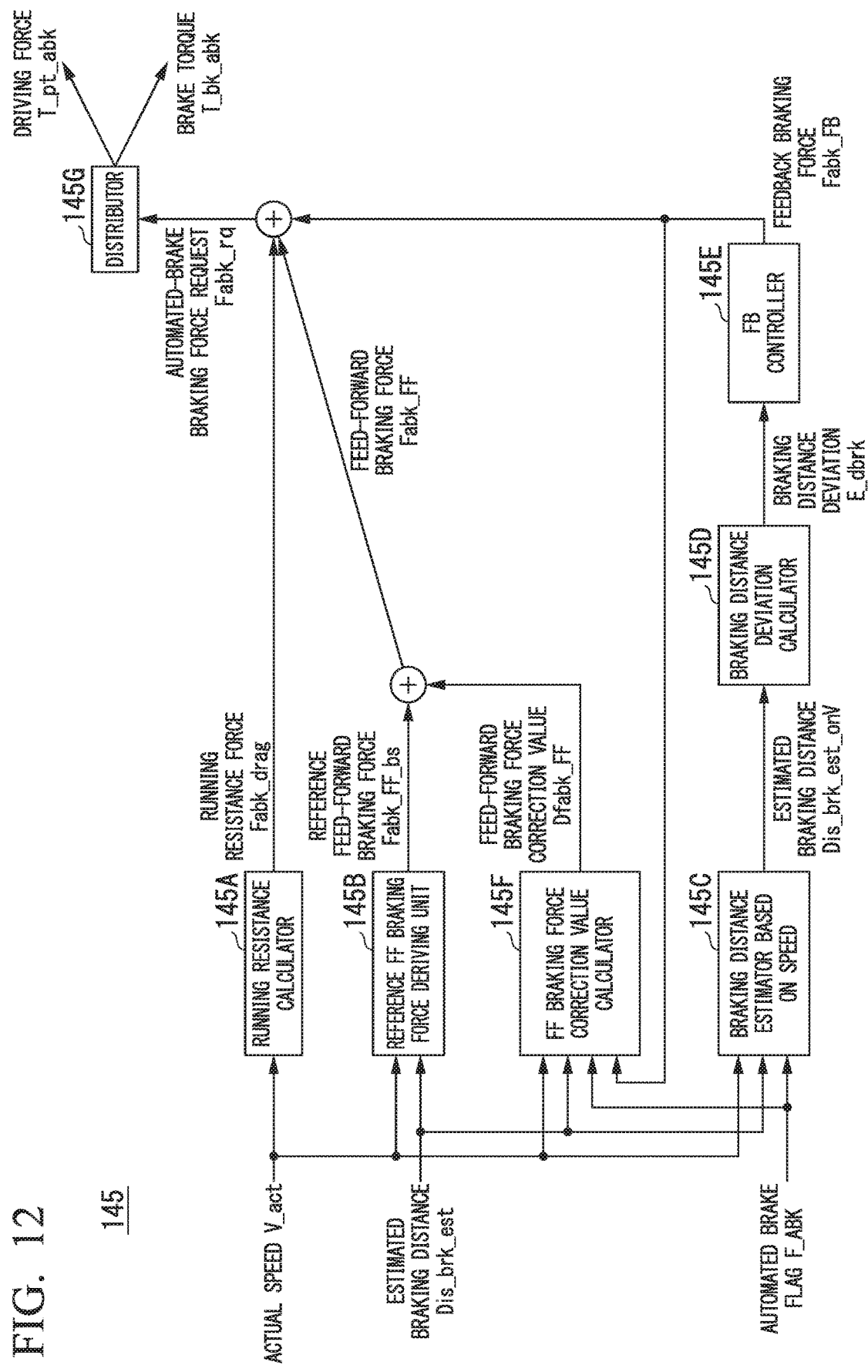
FIG. 12 is a diagram illustrating a configuration of the automated stopping controller 145.

FIG. 12 is a diagram illustrating the configuration of the automated stopping controller 145. The automated stopping controller 145 includes, for example, a running resistance calculator 145A, a reference FF braking force deriving unit 145B, a braking distance estimator 145C based on a speed, a braking distance deviation calculator 145D, an FB controller 145E, an FF braking force correction value calculator 145F, and a distributor 145G.

The running resistance calculator 145A performs the same process as the FF driving force determiner 144A (here, the first corrected target speed Vr_f1 as an input is replaced with the actual speed V_act) and calculates a running resistance force Fabk_drag.

The actual speed V_act and the estimated braking distance Dis_brk_est are input to the reference FF braking force deriving unit 145B. The estimated braking distance Dis_brk_est is an example of a "braking distance which is a distance to a stop position based on a detection result from a sensor." The reference FF braking force deriving unit 145B calculates a reference feed-forward braking force Fabk_FF_bs on the basis of the actual speed V-act and the estimated braking distance Dis_brk_est. The "braking distance to a stop position based on the detection result from the sensor" may be the detected braking distance Dis_brk_det, may be a distance based on both the estimated braking distance Dis_brk_est and the detected braking distance Dis_brk_det, or may be a distance in which other elements are reflected. In the following description, the processes (for example, a process of the FF braking force correction value calculator 145F) which are performed using the estimated braking distance Dis_brk_est may be performed using the detected braking distance Dis_brk_det instead of the estimated braking distance Dis_brk_est.

Here, when it is assumed that a stopping time until the host vehicle M stops is defined as Tstop and a deceleration Alfa is constant, the actual speed V-act, the estimated braking distance Dis_brk_est, and the deceleration Alfa satisfy a relationship expressed by Equation (30). In Equation (30), the stopping time Tsop is erased on the basis of the relationship of Tstop=V_act/Alfa. From Equation (30), a required deceleration Alfa_req(k) for causing the vehicle to stop at a constant deceleration is calculated by Equation (31). A skilled driver knows that a braking force based on a braking operation shows a change close to a constant up to stopping. Since the automated stopping controller 145 according to the embodiment derives the reference feed-forward braking force Fabk_FF_bs on the premise that the deceleration is constant, it is possible to perform automated braking control without discomfort.

$$Dis\_brk\_est = V\_act(k)Tstop(k) - \tfrac{1}{2}Alfa(k)Tstop^2(k) = \tfrac{1}{2}V\_act^2(k)/Alfa\_req(k) \quad (30)$$

$$Alfa\_req(k) = \tfrac{1}{2}V\_act^2(k)/Dis\_brk\_est(k) \quad (31)$$

As expressed by Equation (32), the reference FF braking force deriving unit 145B calculates the reference feed-forward braking force Fabk_FF_bs(k) by multiplying the required deceleration Alfa_req(k) by the weight mw of the host vehicle M. The process of the reference FF braking force deriving unit 145B may be performed through the above-mentioned calculation, or may be performed, for example, with reference to a table or a map in which the required deceleration Alfa_req or the reference feed-forward braking force Fabk_FF_bs is correlated with a combination of the actual speed V_act and the estimated braking distance Dis_brk_est.

$$Fabk\_FF\_bs = mw \tfrac{1}{2}V\_act^2(k)/Dis\_brk\_est \quad (32)$$

The braking distance estimator 145C based on a speed calculates an estimated deceleration value Alfa_act(k), for example, on the basis of Equation (33), calculates an estimated stopping time Tstop_est(k) on the basis of Equation (34), and calculates an estimated braking distance Dis_brk_est_onV(k) on the basis of Equation (35). In Equation (33), ΔT denotes a control cycle, and m denotes a sampling difference (for example, a value of about 3 to 5) in calculating a deceleration. By performing downsampling in this way, it is possible to improve resistance to noise.

$$Alfa\_act(k) = \{V\_act(k) - V act(k-m)\}/(m\Delta T) \quad (33)$$

$$Tstop\_est(k) = V\_act(k)/Alfa\_act(k) \quad (34)$$

$$Dis\_brk\_est\_onV = V\_act(k)Tstop\_est(k) - \tfrac{1}{2}Alfa\_act(k)Tstop\_est^2(k) \quad (35)$$

The braking distance deviation calculator 145D calculates a braking distance deviation E_dbrk(k), for example, on the basis of Equation (36).

$$E\_dbr = \begin{cases} 0 & (F\_ABK(k) = 0) \\ Dis\_brk\_est\_onV(k) - Dis\_brk\_est(k) & (F\_ABK(k) = 1) \end{cases} \quad (36)$$

The FB controller 145E performs feedback control for decreasing the braking distance deviation E_dbrk(k). The FB controller 145E performs feedback control such that a state in which a changeover function σ(k) expressed by Equation (37) is zero is maintained. In the equation, n denotes a changeover function time difference and is, for example, a value corresponding to three to eight cycles. The state in which the changeover function σ(k) is zero refers to a state in which a change of the braking distance deviation E_dbrk(k) over time is in a changeover straight line expressed by E_dbrk(k)=−S×E_dbrk(k−n). In the equation, S has a value between −1 and 0.

$$\sigma(k) = E\_dbrk(k) + S \times E\_dbrk(k-n) \quad (37)$$

The FB controller 145E calculates a feedback braking force Fabk_FB(k) on the basis of Equation (38). In the equation, Fabk_rch(k) denotes a reach rule input and is expressed by Equation (39). Fabk_adp(k) denotes an adaptation rule input and is expressed by Equation (40). Krch and Kadp denote feedback coefficients having a negative value. In this way, the FB controller 145E performs control for decreasing a separation from the changeover straight line.

$$Fabk\_FB(k) = \begin{cases} 0 & (F\_ABK(k) = 0) \\ Fabk\_rch(k) + Fabk\_adp(k) & (F\_ABK(k) = 1 \text{ and } V\_act(k) > Vth) \\ Fabk\_Hold & (F\_ABK(k) = 1 \text{ and } V\_act(k) \leq Vth) \end{cases} \quad (38)$$

$$Fabk\_rch = Krch \times \sigma(k) \quad (39)$$

$$Fabk\_adp(k) = \begin{cases} 0 & (F\_ABK(k) = 0) \\ Fabk\_adp(k-1) + Kadp\ \sigma(k) & (F\_ABK(k) = 1) \end{cases} \quad (40)$$

Fabk_Hold in Equation (38) has a predetermined value that can curb a creep to stop. A threshold value Vth has, for example, a value of about 5 [km/h].

Figure 13:
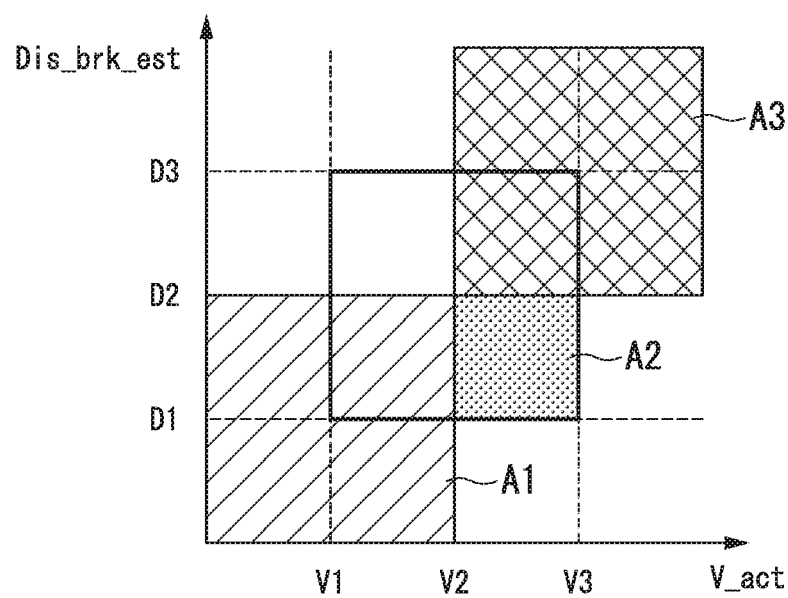
FIG. 13 is a diagram illustrating details of a process which is performed by an FF braking force correction value calculator 145F.

FIG. 13 is a diagram illustrating details of the process which is performed by the FF braking force correction value calculator 145F. The actual speed V_act, the estimated braking distance Dis_brk_est, the automated braking flag F_ABK, and the feedback driving force Fabk_FB are input to the FF braking force correction value calculator 145F. The FF braking force correction value calculator 145F calculates a feed-forward braking force correction value Dfabk_FF(k) on the basis of the input information. The feed-forward braking force correction value Dfabk_FF(k) is an example of the corrected braking force.

The FF braking force correction value calculator 145F calculates a speed weighting function Wsp_i(k) and a braking distance weighting function Wdis_i(k) on the basis of the input actual speed V_act and the estimated braking distance Dis_brk_est. Here, for example, i=3 is set, but i may have another numeral.

Figure 14:
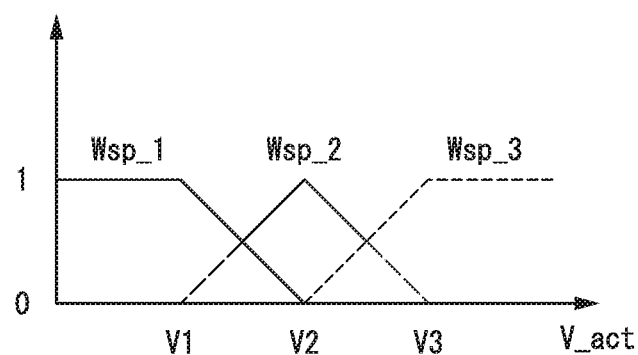
FIG. 14 is a diagram illustrating a deriving rule of a speed weighting function Wsp_i(k)

FIG. 14 is a diagram illustrating a rule for deriving the speed weighting function Wsp_i(k). As illustrated in the drawing, the speed weighting function Wsp_1(k) outputs a value which is 1 when the actual speed V_act is equal to or less than a threshold value V1, decreases monotonously with an increase in the actual speed V_act when the actual speed V_act is between the threshold value V1 and a threshold value V2, and is zero when the actual speed V_act is equal to or greater than the threshold value V2. The speed weighting function Wsp_2(k) outputs a value which is 0 when the actual speed V_act is equal to or less than the threshold value V1, increases monotonously with an increase in the actual speed V_act when the actual speed V_act is between the threshold value V1 and the threshold value V2, decreases monotonously with an increase in the actual speed V_act when the actual speed V_act is between the threshold value V2 and a threshold value V3, and is zero when the actual speed V_act is equal to or greater than the threshold value V3. The speed weighting function Wsp_3(k) outputs a value which is zero when the actual speed V_act is equal to or less than the threshold value V2, increases monotonously with an increase in the actual speed V_act when the actual speed V_act is between the threshold value V2 and the threshold value V3, and is 1 when the actual speed V_act is equal to or greater than the threshold value V3.

Figure 15:
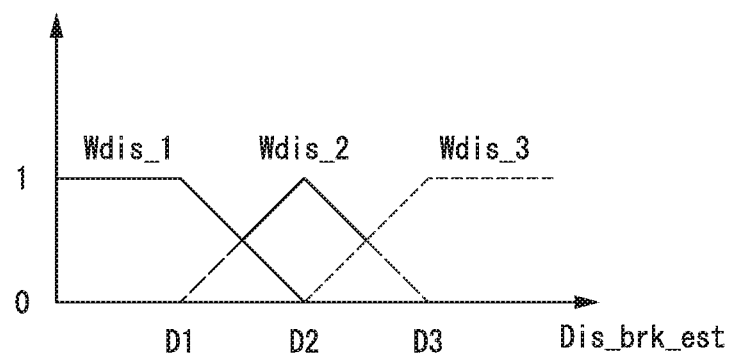
FIG. 15 is a diagram illustrating a deriving rule of a braking distance weighting function Wdis_i(k)

FIG. 15 is a diagram illustrating a rule for deriving the braking distance weighting function Wdis_i(k). As illustrated in the drawing, the braking distance weighting function Wdis_1(k) (hereinafter, essentially) outputs a value which is 1 when the estimated braking distance Dis_brk_est is equal to or less than a threshold value D1, decreases monotonously with an increase in the estimated braking distance Dis_brk_est when the estimated braking distance Dis_brk_est is between the threshold value D1 and a threshold value D2, and is zero when the estimated braking distance Dis_brk_est is equal to or greater than the threshold value D2. The braking distance weighting function Wdis_2(k) outputs a value which is 0 when the estimated braking distance Dis_brk_est is equal to or less than the threshold value D1, increases monotonously with an increase in the estimated braking distance Dis_brk_est when the estimated braking distance Dis_brk_est is between the threshold value D1 and the threshold value D2, decreases monotonously with an increase in the estimated braking distance Dis_brk_est when the estimated braking distance Dis_brk_est is between the threshold value D2 and a threshold value D3, and is zero when the estimated braking distance Dis_brk_est is equal to or greater than the threshold value D3. The braking distance weighting function Wdis_3(k) outputs a value which is zero when the estimated braking distance Dis_brk_est is equal to or less than the threshold value D2, increases monotonously with an increase in the estimated braking distance Dis_brk_est when the estimated braking distance Dis_brk_est is between the threshold value D2 and the threshold value D3, and is 1 when the estimated braking distance Dis_brk_est is equal to or greater than the threshold value D3.

An area A1 in FIG. 13 denotes a control area in which neither of the speed weighting function Wsp_1(k) and the braking distance weighting function Wdis_1(k) is zero, an area A2 denotes a control area in which neither of the speed weighting function Wsp_2(k) and the braking distance weighting function Wdis_2(k) is zero, and an area A3 denotes a control area in which neither of the speed weighting function Wsp_3(k) and the braking distance weighting function Wdis_3(k) is zero. These control areas are typical control areas in which a speed and a distance to a stop position decreases by automated braking control and are control areas in which fine adjustment can be preferably performed. The FF braking force correction value calculator 145F may not include a component Fabk_FB(k−1) that decreases the following feedback braking force in the feed-forward braking force correction value Dfabk_FF(k) in other control areas, that is, when the actual speed V_act is higher than a predetermined threshold value (β1) and the estimated braking distance Dis_brk_est is lower than a predetermined threshold value (β2) and when the actual speed V_act is higher than a predetermined threshold value (β3) and the estimated braking distance Dis_brk_est is lower than a predetermined threshold value (β4). Here, β1≥β3 and β2≤β4 are satisfied. When a weak braking force is output, an occupant may feel discomfort with change of a braking force due to feedback but the absolute value of the feedback correction value can be curbed due to a feed-forward effect.

The FF braking force correction value calculator 145F calculates an adaptive error signal Evns_ab(k), for example, on the basis of Equation (41) and calculates a local adaptive error signal Evns_ab_ij(k), for example, on the basis of Equation (42) using the adaptive error signal Evns_ab(k), the speed weighting function Wsp_i(k), and the braking distance weighting function Wdis_i(k). Fabk_FB(k−1) in Equation (41) denotes a previous value of the feedback braking force.

$$\text{Evns\_ab}(k) = \begin{cases} -\text{Fabk\_FB}(k-1) & (\text{F\_ABK}(k) = 1) \\ 0 & (\text{F\_ABK}(k) = 0) \end{cases} \quad (41)$$

$$\text{Evns\_ab\_ij}(k) = \text{Wsp\_i}(k) * \text{Wdis\_j}(k) * \text{Evns\_ab}(k) \quad (42)$$

The FF braking force correction value calculator 145F calculates a local correction value Dff_abk_ij(k) which is an integrated value of the local adaptive error signal Evns_ab_ij(k), for example, on the basis of Equation (43) and calculates a feed-forward braking force correction value Dfabk_FF(k) by summing the local correction values Dff_abk_ij(k) with respect to factors i and j as expressed by Equation (44). Kvns_abk in Equation (43) denotes an adaptative gain.

$$\text{Dff\_abk\_ij}(k) = \text{Dff\_abk\_ij}(k-1) + \text{Kvns\_abk} \, \text{Evns\_ab\_ij}(k) \quad (43)$$

-continued $$Dfabk\_FF(k) = 1 + \sum_i \sum_j Wsp\_i(k) * Wdis\_j(k) * DFF\_abk\_ij(k) \quad (44)$$

The automated stopping controller 145 calculates the feed-forward braking force Fabk_FF by adding the reference feed-forward braking force Fabk_FF_bs(k) and the feed-forward braking force correction value Dfabk_FF(k). The running resistance force Fabk_drag, the feed-forward braking force Fabk_FF, and the feedback braking force Fabk_FB are added to calculate an automated-brake braking force request Fabk_rq.

The distributor 145G distributes the automated-brake braking force request Fabk_rq into a driving force T_pt_abk which is applied to the travel driving force output device 200 and a brake torque T_bk_abk which is applied of the brake device 210.

Figure 16:
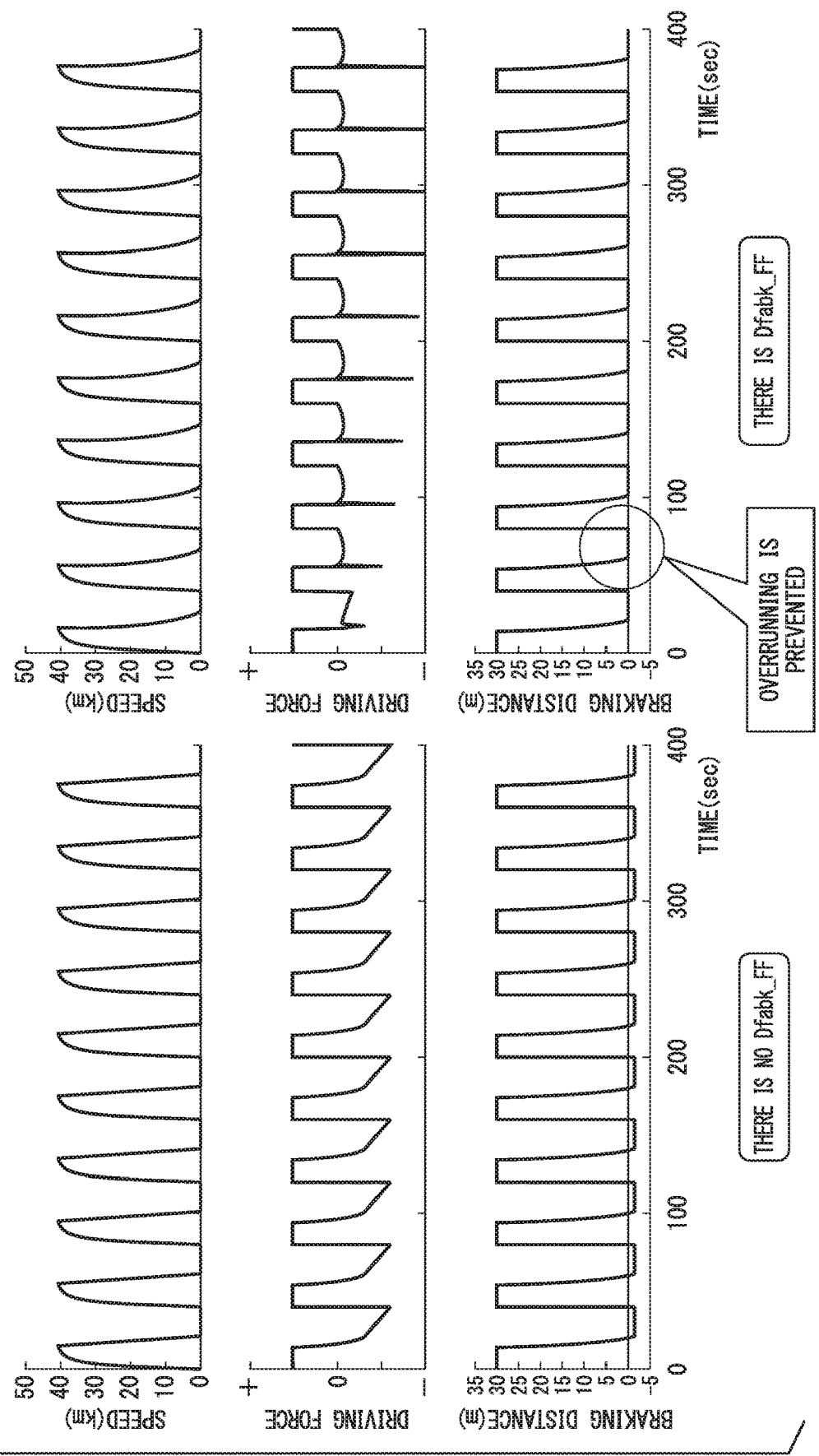
FIG. 16 is a diagram illustrating advantages of application of a feed-forward braking force correction value Dfabk_FF to control.

FIG. 16 is a diagram illustrating advantages of application of the feed-forward braking force correction value Dfabk_FF to control. The left part of FIG. 16 represents a speed, a driving force (where minus denotes a braking force), and a change in a braking distance when the feed-forward braking force correction value Dfabk_FF has not been applied to the control, and the right part of FIG. 16 represents a speed, a driving force (where minus denotes a braking force), and a change in a braking distance when the feed-forward braking force correction value Dfabk_FF has been applied to the control. As illustrated in the drawing, when the feed-forward braking force correction value Dfabk_FF has been applied to the control, responsiveness to approach of a stop position is improved and a phenomenon in which the braking distance is minus, that is, overrunning in which the host vehicle M stops over a stop position is suppressed.

As described above, the vehicle controller according to the embodiment can perform accurate and smooth automated braking control by deriving a reference feed-forward braking force Fabk_FF_bs on the premise that a deceleration is constant and performing feedback control such that a braking distance deviation E_dbrk(k) decreases.

While an embodiment of the invention has been described above with reference to examples, but the invention is not limited to the embodiment and can be subjected to various modifications and substitutions without departing from the gist of the invention.

For example, it has been described in the above-mentioned embodiment that automated driving is performed along a route to a destination, but the invention is not limited thereto and road-tracking automated driving may be performed. Road-tracking automated driving means that a vehicle travels while maintaining a traveling lane without changing the lane, but automatedally performs steering control in a curved road. An output of a steering force may be in charge of by an occupant's operation and only driving and braking control may be automatedally performed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle controller comprising:
   a processor; and
   a memory that stores instructions that, when executed by the processor, facilitates performance of operations, comprising:
   determining a distance to a stop position as a first distance based on an image captured by an imaging device that images a front of a vehicle;
   determining a braking distance to the stop position based on the first distance at a reference time and a second distance determined as a function of a speed of the vehicle, the second distance being a traveling distance sum value for each of a plurality of control cycles from the reference time to a time of one control cycle of the plurality of control cycles after the reference time, and
   adjusting a degree of reflection of the second distance in the braking distance based on the first distance recognized after the reference time.

2. The vehicle controller according to claim 1, wherein the operations further comprise:
   determining the braking distance by repeatedly performing subtraction of a value, which is obtained by multiplying the traveling distance sum value by a predetermined coefficient representative of the degree of reflection, from the first distance at the reference time, and
   adjusting the predetermined coefficient based on the first distance in each control cycle of the plurality of control cycles.

3. A vehicle controller comprising:
   a processor; and
   a memory that stores executable instructions that, when executed by the processor, facilitate performance of operations, comprising:
   determining a distance to a stop position as a first distance based on an image captured by an imaging device that images a front of the vehicle;
   determining a braking distance to the stop position based on the first distance at a reference time and a second distance determined as a function of a speed of the vehicle, the second distance being a traveling distance sum value for each of a plurality of control cycles from the reference time to a time of one control cycle of the plurality of control cycles after the reference time;
   determining the braking distance by repeatedly performing subtraction of a value, which is obtained by adding or subtracting a predetermined correction value representative of the degree of reflection to or from the traveling distance sum value, from the first distance at the reference time; and
   adjusting the predetermined correction value based on the first distance in each control cycle of the plurality of control cycles.

4. The vehicle controller according to claim 1, wherein the operations further comprise: adjusting the degree of reflection of the traveling distance sum value in each control cycle of the plurality of control cycles in the braking distance based on a difference between a change of the first distance from the reference time to the time of the one control cycle and the traveling distance sum value from the reference time to the time of the one control cycle.

5. The vehicle controller according to claim 1, wherein the operations further comprise: stopping an update of the degree of reflection when the first distance is equal to or less than a threshold value.

6. A vehicle control method using a computer comprising a processor mounted in a host vehicle, comprising:
- determining, by the processor, a distance to a stop position as a first distance based on an image captured by an imaging device that images a front of a vehicle;
- determining, by the processor, a braking distance to the stop position based on the first distance at a reference time and a second distance determined as a function on of a speed of the vehicle, the second distance being a traveling distance sum value for each of a plurality of control cycles from the reference time to a time of one control cycle of the plurality of control cycles after the reference time; and
- adjusting, by the processor, a degree of reflection of the second distance in the braking distance based on the first distance recognized after the reference time.

7. A non-transitory computer-readable storage medium storing a program causing a processor to execute instructions to perform operations, comprising:
- determining a distance to a stop position as a first distance based on an image captured by an imaging device that images a front of a vehicle;
- determining a braking distance to the stop position based on the first distance at a reference time and a second distance determined as a function of a speed of the vehicle, the second distance being a traveling distance sum value for each of a plurality of control cycles from the reference time to a time of one control cycle of the plurality of control cycles after the reference time; and
- adjusting a degree of reflection of the second distance in the braking distance based on the first distance recognized after the reference time.

* * * * *